US011287521B2

(12) United States Patent
Charpentier et al.

(10) Patent No.: US 11,287,521 B2
(45) Date of Patent: Mar. 29, 2022

(54) SYSTEMS AND METHODS FOR IMPROVED RADAR SCANNING COVERAGE AND EFFICIENCY

(71) Applicant: Bodidata, Inc., St. Petersburgh, FL (US)

(72) Inventors: Albert Charpentier, Malvern, PA (US); Michael Boylan, Phoenixville, PA (US); Tuoc Luong, Saratoga, CA (US); Hoa V. Pham, Hanoi (VN); Long Nguyen, Ho Chi Minh (VN); Hai Nguyen, Ho Chi Minh (VN); Tung V. Vu, Ho Chi Minh (VN)

(73) Assignee: BODIDATA, INC., St. Petersburg, FL (US)

( * ) Notice: Subject to any disclaimer, the term of this patent is extended or adjusted under 35 U.S.C. 154(b) by 0 days.

(21) Appl. No.: 16/928,369

(22) Filed: Jul. 14, 2020

(65) Prior Publication Data

US 2021/0018608 A1 Jan. 21, 2021

Related U.S. Application Data

(60) Provisional application No. 62/874,618, filed on Jul. 16, 2019.

(51) Int. Cl.
*G01S 13/42* (2006.01)
*G01S 13/89* (2006.01)
(Continued)

(52) U.S. Cl.
CPC .......... *G01S 13/426* (2013.01); *G01S 13/89* (2013.01); *G06T 7/521* (2017.01); *G06T 17/00* (2013.01);
(Continued)

(58) Field of Classification Search
CPC ....... G01S 13/426; G01S 13/89; G06T 7/521; G06T 17/00; G06T 19/00;
(Continued)

(56) References Cited

U.S. PATENT DOCUMENTS

| 5,198,877 A | 3/1993 | Schulz |
| 6,392,747 B1 * | 5/2002 | Allen ...................... G01S 7/486 356/141.1 |

(Continued)

FOREIGN PATENT DOCUMENTS

| CA | 2359513 A1 | 4/2003 |
| CN | 102096072 A | 6/2011 |
| WO | 2013096704 A1 | 6/2013 |

OTHER PUBLICATIONS

International Search Report issued in PCT/US2020/041919 dated Oct. 8, 2020.

(Continued)

*Primary Examiner* — Terrell M Robinson
(74) *Attorney, Agent, or Firm* — Fox Rothschild LLP; Carol Thorstad-Forsyth

(57) ABSTRACT

System and methods for obtaining sizing of an irregularly shaped object. The methods comprise: displaying, by a display of a handheld scanner system, a 3D optical figure of a subject; displaying a grid superimposed over the 3D optical figure of the subject, the grid comprising a plurality of marks arranged in rows and columns; generating, by a radar module of the handheld scanner system, range data specifying a sensed spacing between the radar module and at least a surface of a first portion of the irregularly shaped object which is covered by at least one item; receiving, by a processor of the handheld scanner system, the range data from the radar module as the subject is being scanned; and causing at least one first visual characteristic of a first mark (Continued)

of said plurality of marks to change when corresponding range data is successfully received by the processor.

30 Claims, 20 Drawing Sheets

(51) Int. Cl.
*G06T 17/00* (2006.01)
*G06T 19/00* (2011.01)
*G06T 7/521* (2017.01)

(52) U.S. Cl.
CPC .... *G06T 19/00* (2013.01); *G06T 2207/10028* (2013.01); *G06T 2207/10044* (2013.01); *G06T 2207/30196* (2013.01)

(58) Field of Classification Search
CPC . G06T 2207/10028; G06T 2207/10044; G06T 2207/30196
See application file for complete search history.

(56) References Cited

U.S. PATENT DOCUMENTS

| | | |
|---|---|---|
| 6,542,249 B1 | 4/2003 | Kofman et al. |
| 6,546,309 B1 | 4/2003 | Gazzuolo |
| 7,256,899 B1 | 8/2007 | Faul et al. |
| 2002/0161799 A1* | 10/2002 | Maguire, III ........... G06F 40/18 715/212 |
| 2003/0001771 A1* | 1/2003 | Ono ...................... G01S 13/931 342/70 |
| 2009/0323121 A1 | 12/2009 | Valkenburg et al. |
| 2012/0288137 A1* | 11/2012 | Daly ...................... G01V 8/005 382/100 |
| 2013/0022237 A1 | 1/2013 | Kuznetsov et al. |
| 2014/0168013 A1 | 6/2014 | Wang et al. |
| 2016/0088284 A1 | 3/2016 | Sareen et al. |
| 2016/0093085 A1 | 3/2016 | Ray et al. |
| 2016/0178747 A1 | 6/2016 | Charpentier et al. |
| 2016/0203361 A1 | 7/2016 | Black et al. |
| 2016/0223647 A1 | 8/2016 | Nichols et al. |
| 2018/0165870 A1 | 6/2018 | Stokes |
| 2018/0231647 A1* | 8/2018 | Fabrizio .................. G01S 15/89 |
| 2019/0187265 A1 | 6/2019 | Barbello et al. |

OTHER PUBLICATIONS

Office Action issued in Brazilian Patent Application No. 1120160308409 dated Oct. 30, 2020.

Sementille, A.C., et al., "Long Paper a Motion Capture System Using Passive Markers," Jun. 16, 2004, XP055329562; retrieved from the Internet: UEL:http://dl.acm.org/ft_gateway.cfm?id=1044684 &ftid=295843&dwn=1&CFID=876451377&CFT OKEN= 9877936 [retrieved on Dec. 15, 2016].

International Search Report and Written Opinion completed Jun. 24, 2019 for PCT/US2019/022207.

* cited by examiner

SYSTEMS AND METHODS FOR IMPROVED RADAR SCANNING COVERAGE AND EFFICIENCY

CROSS-REFERENCE TO RELATED APPLICATIONS

This application claims priority from U.S. Provisional Patent Application Ser. No. 62/874,618 which was filed on Jul. 16, 2019. The contents of this U.S. Provisional Patent Application are hereby incorporated in its entirety by reference.

BACKGROUND

Statement of the Technical Field

The present disclosure relates generally to data processing systems. More particularly, the present disclosure relates to implementing systems and methods for improved radar scanning coverage and efficiency.

DESCRIPTION OF THE RELATED ART

Clothing shoppers today are confronted with the dilemma of having an expansive number of choices of clothing style, cut and size and not enough information regarding their size and how their unique body proportions will fit into the current styles.

SUMMARY

The present disclosure concerns implementing systems and methods for obtaining sizing of an irregularly shaped object (e.g., an individual). The methods comprise: displaying, by a display of a handheld scanner system, a 3D optical figure of a subject; displaying a grid superimposed over the 3D optical figure of the subject, the grid comprising a plurality of marks arranged in rows and columns; generating, by a radar module of the handheld scanner system, range data specifying a sensed spacing between the radar module and at least a surface of a first portion of the irregularly shaped object which is covered by at least one item (e.g., a garment being worn by the individual); receiving, by a processor of the handheld scanner system, the range data from the radar module as the subject is being scanned; and causing at least one first visual characteristic (e.g., a color, a shape, or a size) of a first mark of said plurality of marks to change when corresponding range data is successfully received by the processor.

The methods may also comprise: generating, by an optical module of the handheld scanner system, a 3D point cloud data representing a surface of at least one item covering at least a first portion of the irregularly shaped object, and a surface of a second portion of the irregularly shaped object's surface which is exposed; receiving, by the processor, the 3D point cloud data from the optical module as the subject is being scanned; and using, by the processor, the 3D point cloud data and the radar data to create a map representing dimensions of the irregularly shaped object's body.

In some scenarios, distance information is also superimposed on the 3D optical figure that specifies a distance from the handheld scanner system to the subject. Additionally or alternatively, the processor causes at least one second visual characteristic of the first mark or a second mark of the plurality of marks to change to indicate a pointing direction of the handheld scanner system relative to the object being scanned. The second visual characteristic is different than the at least one first visual characteristic. The processor may also cause the at least one second visual characteristic of the first or second mark to change to a previous setting when the pointing direction of the handheld scanner system changes. New marks may additionally be superimposed on top of the 3D optical figure when range data is successfully received during the scanning of the subject for a corresponding area of the object.

The implementing systems comprise: a processor; and a non-transitory computer-readable storage medium comprising programming instructions that are configured to cause the processor to implement a method for obtaining sizing of an irregularly shaped object (e.g., an individual) using a handheld scanner system. The programming instructions comprise instructions to: display a 3D optical figure of a subject; display a grid superimposed over the 3D optical figure of the subject, the grid comprising a plurality of marks arranged in rows and columns; cause a radar module to generate range data specifying a sensed spacing between the radar module and at least a surface of a first portion of the irregularly shaped object which is covered by at least one item (e.g., a garment being worn by the individual); and/or cause at least one first visual characteristic (e.g., a color, a shape, or a size) of a first mark of said plurality of marks to change when corresponding range data is successfully generated by the radar module.

The programming instructions may also comprise instructions to: cause an optical module to generate 3D point cloud data representing a surface of at least one item covering at least a first portion of the irregularly shaped object, and a surface of a second portion of the irregularly shaped object's surface which is exposed; and/or cause a processor to use the 3D point cloud data and the radar data to create a map representing dimensions of the irregularly shaped object's body.

The programming instructions may also comprise instructions to: cause distance information to also be superimposed on the 3D optical figure that specifies a distance from the handheld scanner system to the subject; cause at least one second visual characteristic of the first mark or a second mark of the plurality of marks to change to indicate a pointing direction of the handheld scanner system relative to the object being scanned; cause the at least one second visual characteristic of the first or second mark to change to a previous setting when the pointing direction of the handheld scanner system changes; and/or cause new marks to be additionally superimposed on top of the 3D optical figure when range data is successfully received during the scanning of the subject for a corresponding area of the object. The second visual characteristic may be different than the at least one first visual characteristic.

The present disclosure also concerns a handheld scanner system for obtaining sizing of an irregularly shaped object (e.g., an individual). The handheld scanner system comprises: a housing; an optical module including at least one 3D optical sensor configured to generate a 3D point cloud data representing a surface of at least one item covering at least a first portion of the irregularly shaped object and a surface of a second portion of the irregularly shaped object's surface which is exposed; a radar module including at least one radar sensor configured to generate range data specifying a sensed spacing between the housing and at least a surface of the first portion of the irregularly shaped object which is covered by the at least one item (e.g., a garment being worn by the individual); a display configured to display a grid superimposed over a 3D optical figure of the subject while the subject is being scanned using the optical module and the radar module, the grid comprising a plurality of marks arranged in rows and columns; and a processor. The processor is configured to: receive the 3D point cloud data from the optical module and the range data from the radar module as the subject is being scanned; cause at least one first visual characteristic (e.g., a color, a shape, or a size) of each said mark to change when corresponding range data is successfully received during the scanning of the subject; and use the 3D point cloud data and the radar data to create a map representing dimensions of the irregularly shaped object's body.

In some scenarios, distance information is also superimposed on the 3D optical figure that specifies a distance from the handheld scanner system to the subject. Additionally or alternatively, the processor is further configured to: cause at least one second visual characteristic of a mark of the plurality of marks to change to indicate a pointing direction of the handheld scanner system relative to the object being scanned; cause the at least one second visual characteristic of the mark to change to a previous setting when the pointing direction of the handheld scanner system changes; and/or cause new marks to be additionally superimposed on top of the 3D optical figure when range data is successfully received during the scanning of the subject for a corresponding area of the object. The second visual characteristic may be different than the at least one first visual characteristic.

BRIEF DESCRIPTION OF THE DRAWINGS

The present solution will be described with reference to the following drawing figures, in which like numerals represent like items throughout the figures.

DETAILED DESCRIPTION

Figure 1:
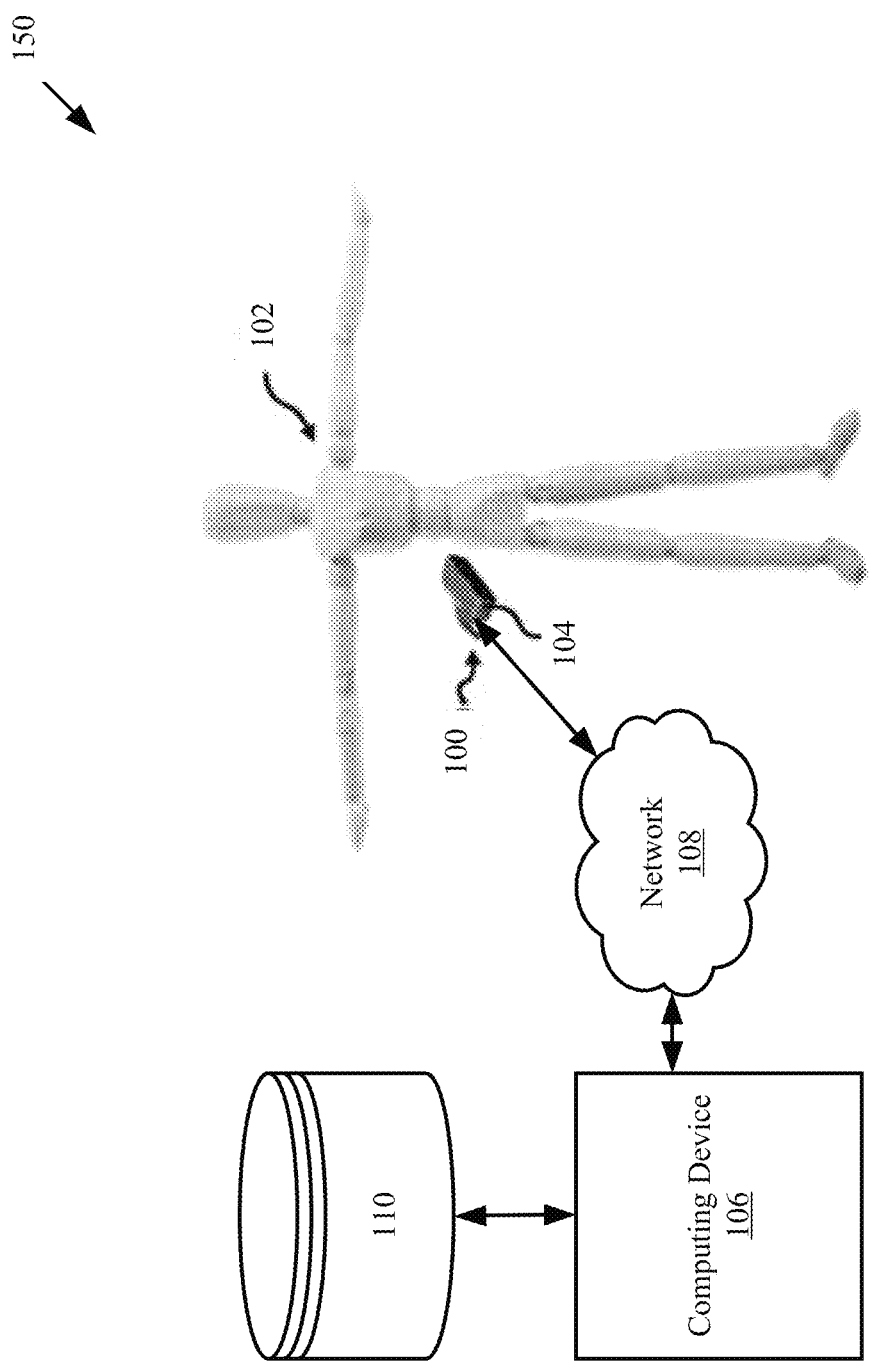
FIG. 1 is a perspective view of an illustrative system implementing the present solution.
Figure 2:
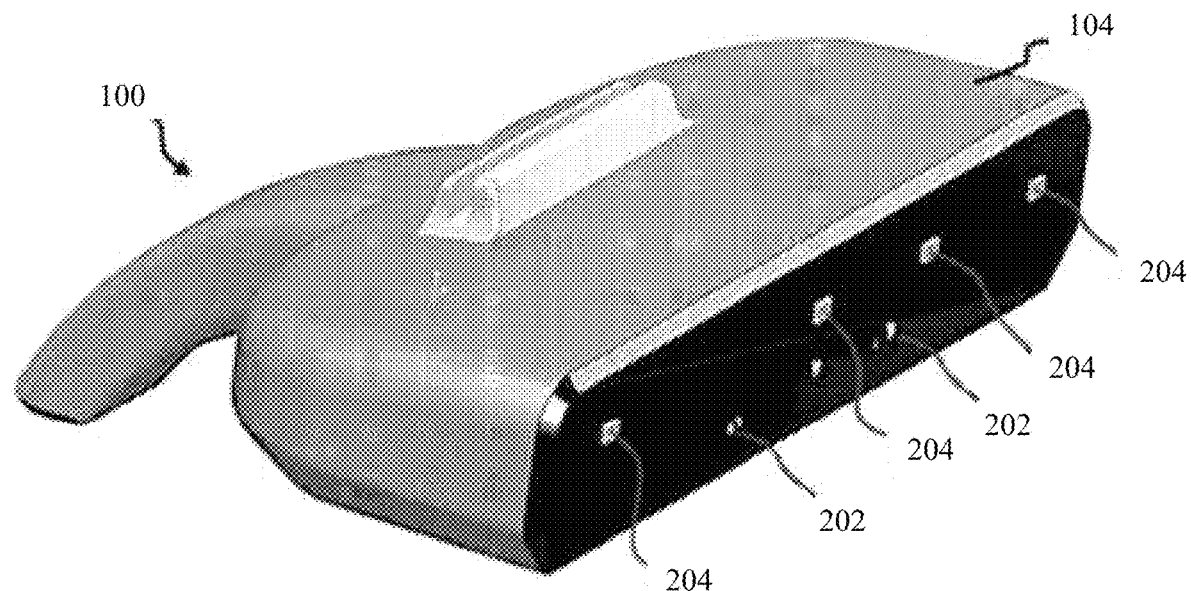
FIG. 2 is a front perspective view of an illustrative handheld scanner system.
Figure 3:
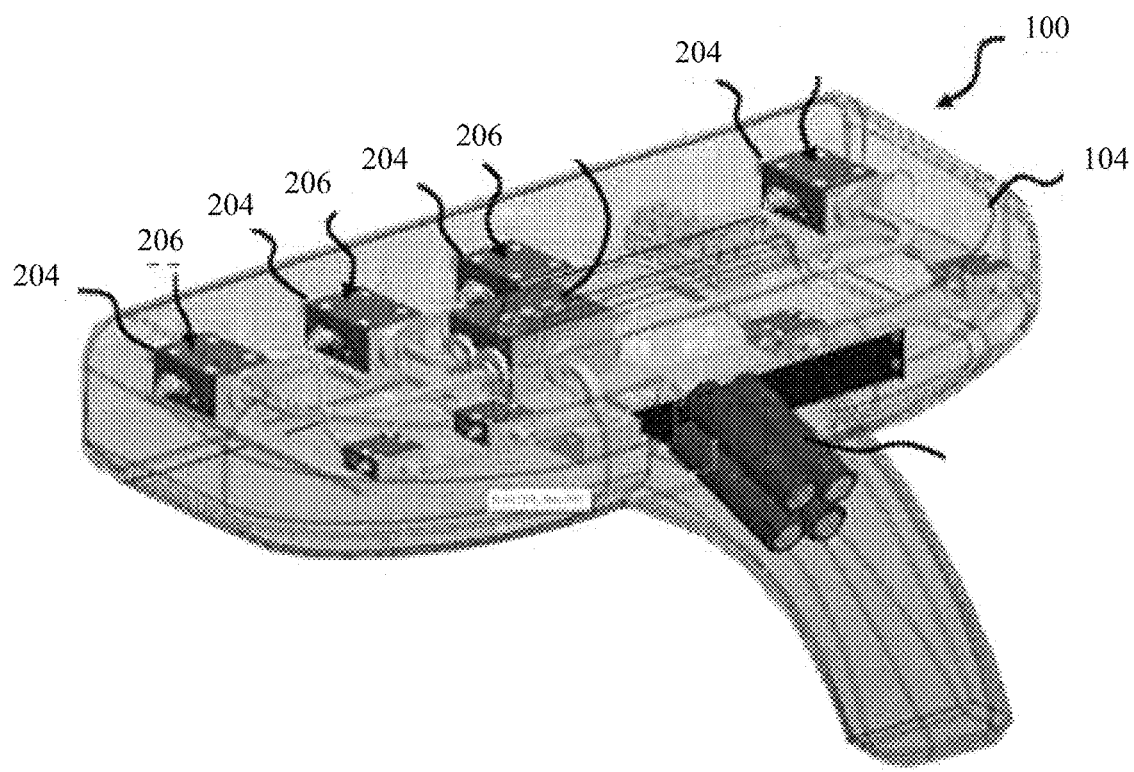
FIG. 3 is a rear perspective view of the handheld scanner system of FIG. 3 with the housing shown transparently.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

There are many systems available for producing a 3D surface scan or point cloud from a complex real-world object. An unlabeled 3D surface is useful for rendering static objects, but is less useful for measurement and interactive display of complex objects comprised of specific regions or sub-objects with known function and meaning. The present solution generally concerns systems and methods for interactively capturing 3D data using a hand-held scanning device with multiple sensors and providing semantic labeling of regions and sub-objects. A resulting model may then be used for deriving improved measurements of the scanned object, displaying functional aspects of the scanned object, and/or determining the scanned object's geometric fit to other objects based on the functional aspects.

In the retail applications, the purpose of the present solution is to establish a set of body measurements by using optical and radar technology to create a 3D point cloud representation of a clothed individual. The garment is transparent to the radar signal which operates at GHz frequencies so the incident radar signal reflects off the body and provides a range measurement to the underlying surface. This feature of the radar is used to determine additional distance information so that it is possible to obtain an accurate set of measurements of the individual. If the distance to the body and the distance to the garment is known, then a collection of accurate measurements can be obtained by taking into account the range differences.

Illustrative System

Referring now to FIGS. 1-4, there are provided illustrations that are useful for understanding a system 150 implementing the present solution. System 150 comprises a handheld scanner system 100. The present solution is not limited to the shape, size and other geometric characteristics of the handheld scanner system shown in FIGS. 2-3. In other scenarios, the handheld scanner system has a different overall design.

In FIG. 1, the handheld scanner system 100 is illustrated positioned relative to an irregularly shaped object 102 (which in the illustrated application is an individual). The handheld scanner system 100 includes a housing 104 in which the various components described below are housed. The housing 104 may have various configurations and is configured to fit comfortably in an operator's hand. A brace or support piece (not shown) may optionally extend from the housing 104 to assist the operator in supporting the handheld scanner system 100 relative to the object 102. During operation, the handheld scanner system 100 is moved about the subject 102 while in close proximity to the subject (e.g., 12" to 25" inches from the subject). The housing 104 can be made of a durable plastic material. The housing sections, which are in the vicinity of the antenna elements, are transparent to the radar frequencies of operation.

Figure 4:
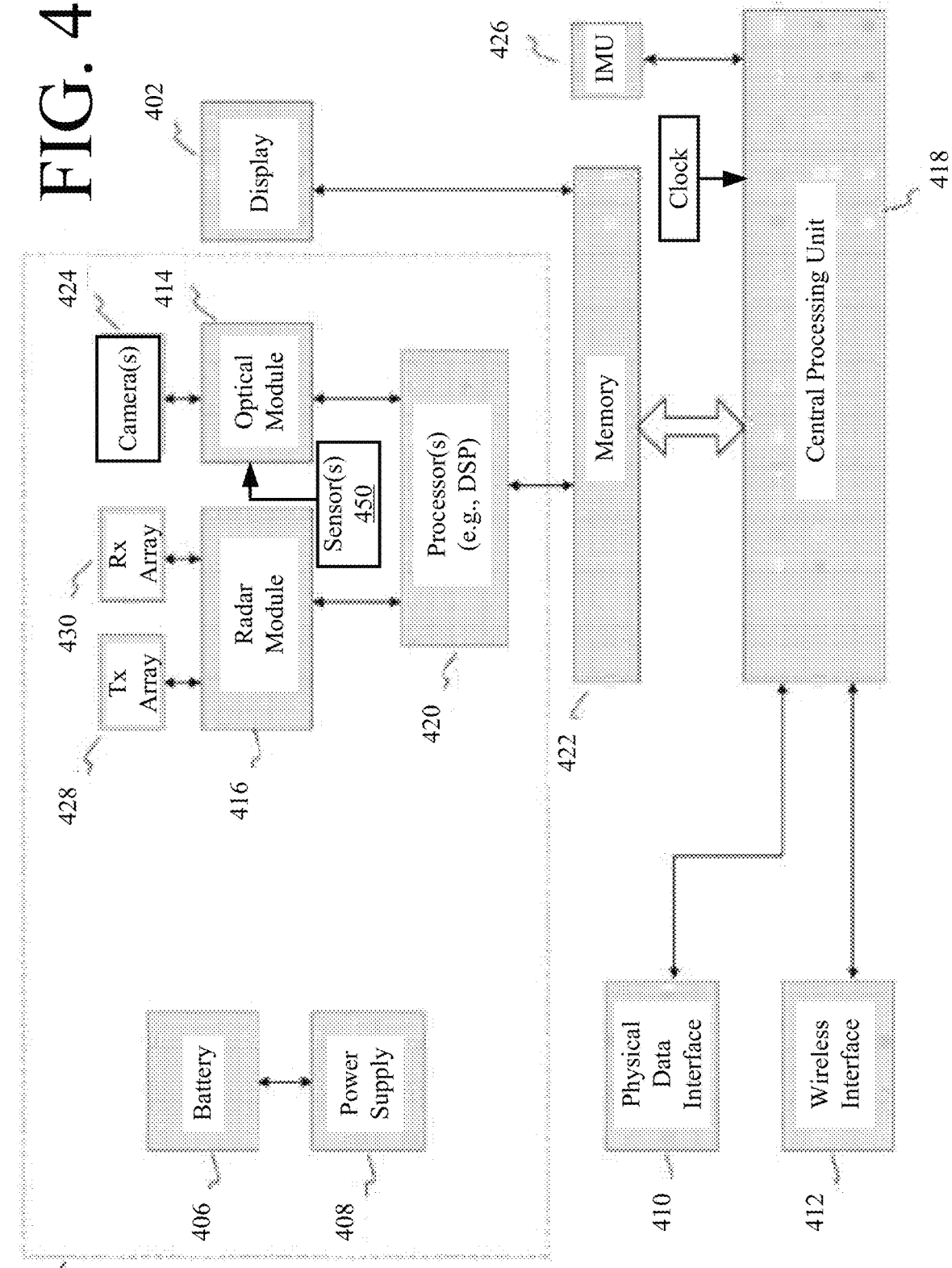
FIG. 4 is a block diagram of an exemplary handheld scanner system.
Figure 5:
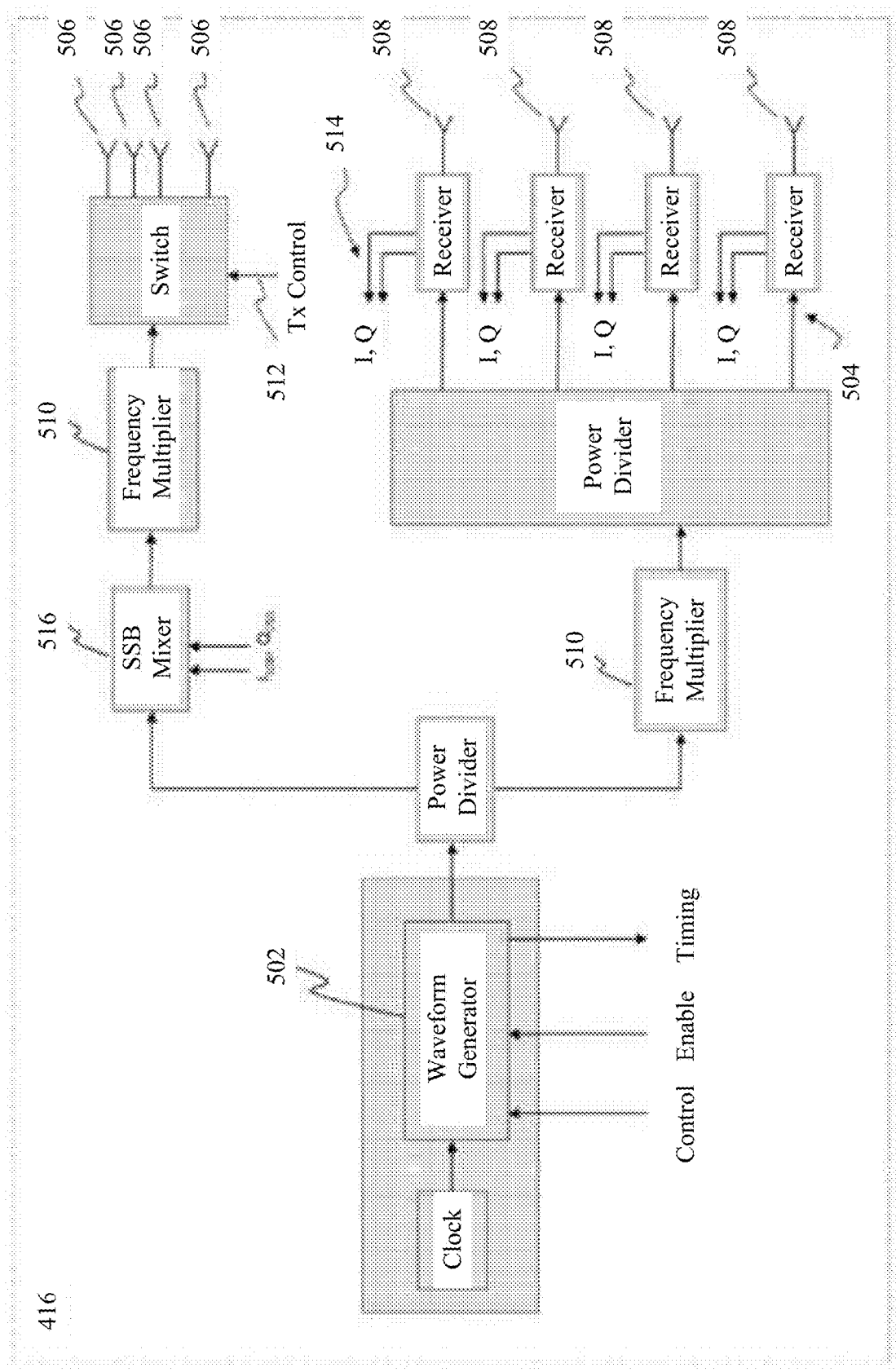
FIG. 5 is a block diagram of an exemplary waveform radar unit.
Figure 6:
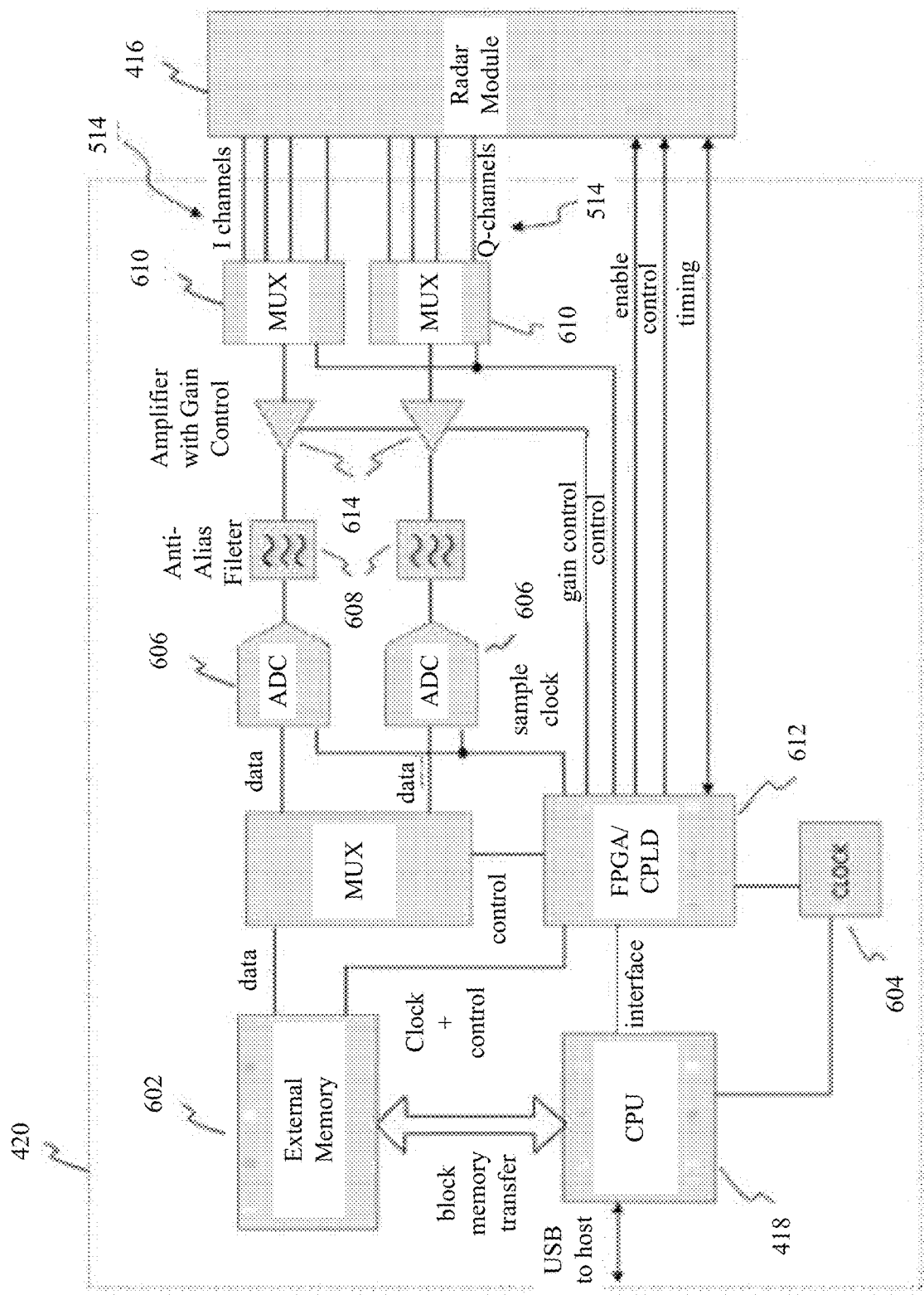
FIG. 6 is a system diagram of an exemplary radar processor.

An illustrative architecture for the handheld scanner system 100 is shown in FIGS. 4-6. The present solution is not limited to this architecture. Other handheld scanner architectures can be used here without limitation.

As shown in FIG. 4, a small display 402 is built into the housing 104 or external to the housing 104 while being visible to the operator during a scan. The display 402 can also be configured to perform basic data entry tasks (such as responding to prompts, entering customer information, and receiving diagnostic information concerning the state of the handheld scanner system 100). Additionally, the handheld scanner system 100 may also incorporate feedback (haptic, auditory, visual, tactile, etc.) to the operator, which will, for example, direct the operator to locations of the customer which need to be scanned. In some scenarios, the feedback (e.g., haptic, auditory, visual, and/or tactile) can indicate to the operator that the handheld scanner system 100 is too close or too far from the subject being scanned.

The handheld scanner system 100 is powered by a rechargeable battery 406 or other power supply 408. The rechargeable battery 406 can include, but is not limited to, a high energy density, and/or a lightweight battery (e.g., a Lithium Polymer battery). The rechargeable battery 406 can be interchangeable to support long-term or continuous operation. The handheld scanner system 100 can be docked in a cradle (not shown) when not in use. While docked, the cradle re-charges the rechargeable battery 406 and provides an interface for wired connectivity to external computer equipment (e.g., computing device 106). The handheld scanner system 100 supports both a wired and a wireless interface 410, 412. The housing 104 includes a physical interface 410 which allows for power, high-speed transfer of data over network 108 (e.g., Internet or Intranet), as well as device programming or updating. The wireless interface 412 may include, but is not limited to, an 802.11 interface. The wireless interface 412 provides a general operation communication link to exchange measurement data (radar and image data) to auxiliary computer equipment 106 (e.g., an external host device) for rendering of the image to the display of an operator's terminal. For manufacturing and testing purposes, an RF test port may be included for calibration of the RF circuitry.

The handheld scanner system 100 utilizes two modes of measurement, namely an optical module 414 mode of measurement and a radar module 416 mode of measurement. The data from both modules 414, 416 is streamed into a Central Processing Unit ("CPU") 418. At the CPU 418 or on the camera module, the optical and radar data streams are co-processed and synchronized. The results of the co-processing are delivered to a mobile computing device or other auxiliary computer equipment 106 (e.g., for display) via the network 108. A Digital Signal Processor ("DSP") 420 may also be included in the handheld scanner system 100.

Subsequent measurement extraction can operate on the 3D data and extracted results can be supplied to a garment fitting engine. Alternatively, the optical data is sent to the radar module 416. The radar module 416 interleaves the optical data with the radar data, and provides a single USB connection to the auxiliary computer equipment 106. The optical data and radar data can also be written to an external data store 110 to buffer optical data frames.

An electronic memory 422 temporarily stores range information from previous scans. The stored data from prior scans can augment processing with current samples as the radar module 416 and optical module 414 moves about the subject to obtain a refined representation of the body and determine body features. In some scenarios, Doppler signal processing or Moving Target Indicator ("MTI") algorithms are used here to obtain the refined representation of the body and determine body features. Doppler signal processing and MTI algorithms are well known in the art, and therefore will not be described herein. Any known Doppler signal processing technique and/or MTI algorithm can be used herein. The present solution is not limited in this regard. The handheld scanner system 100 allows the host platform to use both the optical and radar system to determine two surfaces of an individual (e.g., the garment surface and the wearer's body surface). The radar module 416 may also parse the optical range data and use this information to solve for range solutions and eliminate ghosts or range ambiguity.

The optical module 414 is coupled to one or more cameras 424 and/or sensors 450. The cameras include, but are not limited to, a 3D camera, an RGB camera, and/or a tracking camera. The sensors include, but are not limited to, a laser, and/or an infrared system. Each of the listed types of cameras and/or sensors are known in the art, and therefore will not be described in detail herein.

The 3D camera is configured such that the integrated 3D data structure provides a 3D point cloud (garment and body), regions of volumetric disparity (as specified by an operator), and a statistical representation of both surfaces (e.g., a garment's surface and a body's surface). Such 3D cameras are well known in the art, and are widely available from a number of manufacturers (e.g., the Intel RealSense™ 3D optical camera scanner system).

The optical module 414 may maintain an inertial state vector with respect to a fixed coordinate reference frame and with respect to the body. The state information (which includes orientation, translation and rotation of the unit) is used along with the known physical offsets of the antenna elements with respect to the center of gravity of the unit to provide corrections and update range estimates for each virtual antenna and the optical module. The inertial state vector may be obtained using sensor data from an optional on-board Inertial Measurement Unit ("IMU") 426 or by a multi-antenna radar array (e.g., with 3 or more elements). IMUs and multi-antenna radar arrays are well known in the art, and therefore will not be described herein. Any known or to be known IMU and/or multi-antenna radar array can be used herein without limitation.

The capabilities of such systems routinely achieve millimeter accuracy and resolution at close distances and increase to centimeter resolution at further distances. Despite their excellent resolution, obtaining body dimensionality of a clothed individual is limited by any obstruction such as a garment. Camera systems which project a pattern on the subject provide adequate performance for this application.

As shown in FIG. 5, the radar module 416 generally comprises a waveform generator 502 capable of producing a suitable waveform for range determination, at least one antenna assembly 504 with at least one transmitting element (emitter) 506 and at least one receiving element (receiver) 508, a frequency multiplier 510, a transmit selection switch 512, and a down-converter (stretch processor) which is a matched filter configured to provide a beat frequency by comparing the instantaneous phase of the received target waveform with that of a replica of the transmitted signal, via the quadrature outputs 514. An SSB mixer 516 may be included to perform up-conversion to impart constant frequency shift. This functional block is not mandatory but a design enhancement to combat issues with feedthrough.

It is noted that a desired waveform is a Linear Frequency Modulated ("LFM") chirp pulse. However, other waveforms may be utilized. To achieve high range resolution, the radar module 416 is a broadband system. In this regard, the radar module 416 may include, but is not limited to, a radar module with an X/Ku-band operation. The LFM system includes a delayed replica of the transmission burst to make a comparison with the return pulse. Due to the fact that the operator using the handheld scanner system 100 cannot reliably maintain a fixed separation from the subject, a laser range finder, optical system or other proximity sensor can aid in tracking this separation to the subject's outer garment. This information may be used to validate the radar measurements made using the LFM system and compensate the delay parameters accordingly. Since the optical 3D camera 424 or laser 450 cannot measure to the body which is covered by a garment, the Ultra Wide Band ("UWB") radar module 416 is responsible for making this measurement.

With the illustrated UWB radar module 416, the waveform generator 502 emits a low power non-ionizing millimeter wave (e.g., operating between 58-64 GHz) which passes through clothing, reflects off the body, and returns a scattered response to the radar receiving aperture. To resolve the range, the UWB radar module 416 consists of two or more antenna elements 428, 430 having a known spatial separation. In this case, one or more antenna pairs are used. Apertures 204 are used with associated transmitting elements 428. However, different arrangements are possible to meet both geometric and cost objectives. In the case of multiple transmit apertures 204, each element takes a turn as the emitter, and other elements are receivers.

A single aperture 204 can be used for both transmitting and receiving. A dual aperture can also be used to achieve high isolation between transmit and receive elements for a given channel. Additionally, the antennas 206 can be arranged to transmit with specific wave polarizations to achieve additional isolation or to be more sensitive to a given polarization sense as determined by the target.

The waveform emitted in the direction of the body is an LFM ramp which sweeps across several Gigahertz of bandwidth. The waveform can be the same for all antenna pairs or it can be changed to express features of the reflective surface. The bandwidth determines the unambiguous spatial resolution achievable by the radar module 416. Other radar waveforms and implementations can be used, but in this case an LFM triangular waveform is used.

Referring now to FIG. 6, the DSP 420 generally includes: a clock source 604 to provide a precision time base to operate the processor, memory circuits and sampling clock for ADCs, and time aligns radar data to optical frames; a CPU (or other processor) 418 responsible for configuration of the radar module 416, processing raw radar data, and computing range solution; an external memory 602 which stores raw radar waveforms for processing and also stores calibration information and waveform correction; Analog-to-Digital Converters ("ADCs") 606; anti-aliasing filters 608 which are used to filter an analog signal for low pass (i.e., first Nyquist zone) or band pass (i.e., Intermediate Frequency ("IF")) sampling; digital and analog mux electronics 610, and a Complex Programmable Logic Device ("CPLD") or Field Programmable Gate Array ("FPGA") 612 which coordinate timing of events. It is also possible to eliminate one of the quadrature channels, and hence simplify the receiver hardware and eliminate a single ADC converter chain (elements 606, 608, 610 and 614) if a Hilbert transformer is used to impart a phase shift to the preserved signal chain and obtain the quadrature component necessary for complex signal processing. These processing techniques are well known and applicable to radar processing.

Figure 7:
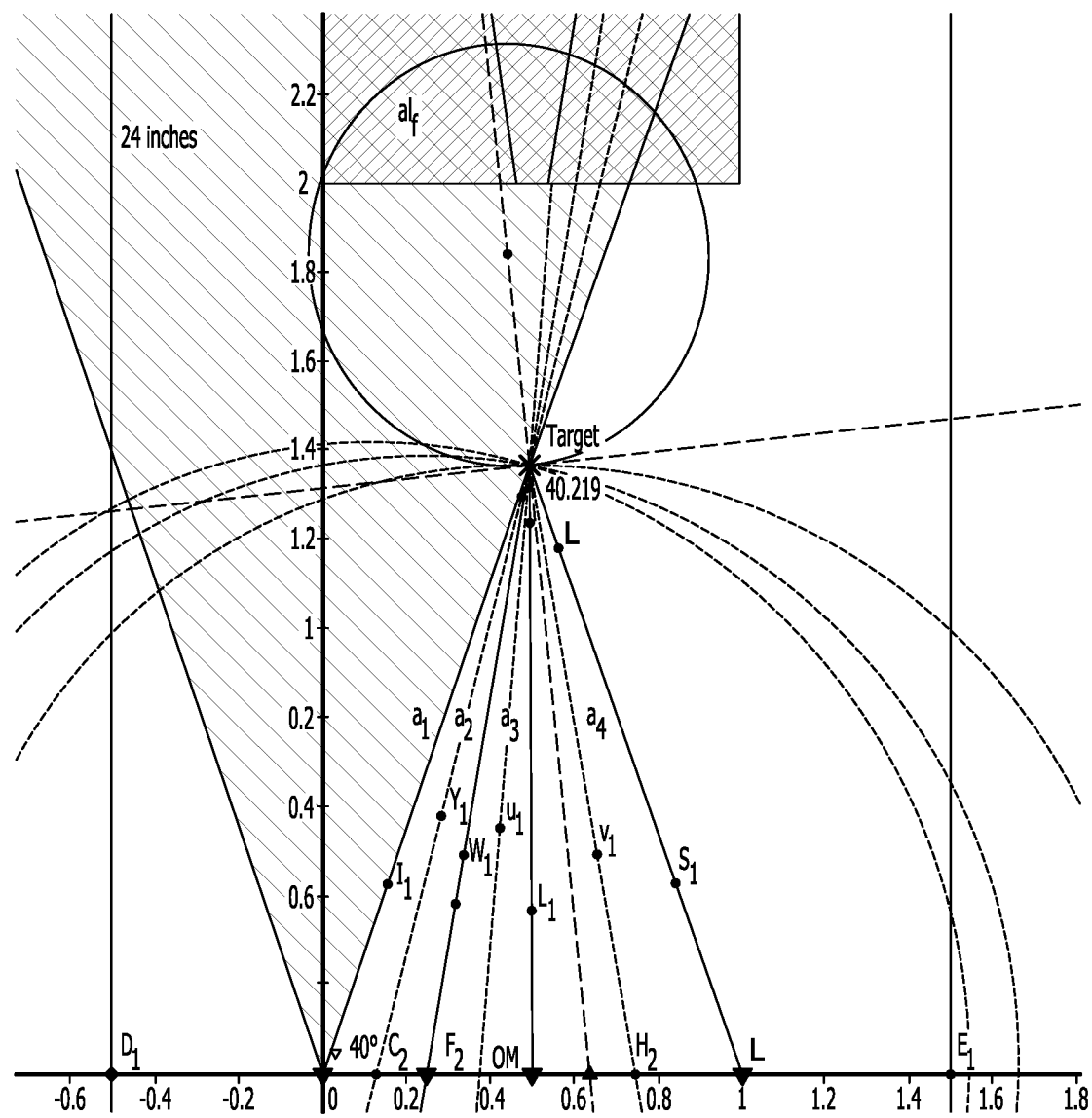
FIG. 7 is a schematic diagram illustrating a multilateration process for an antenna geometry with respect to a target used when multiple antenna apertures are used to simultaneously capture ranging information.

For all combinations of antenna pairs 428, 430, a range determination can be made to the subject via the process of trilateration (for a pair) or multilateration (for a set) of elements. Referring to FIG. 7, with a target at an unknown distance in front of the handheld scanner system 100, the reflected waveform is mixed with a replica of the transmitted waveform and a beat frequency is produced. This beat frequency maps directly to the propagation delay of the ramping waveform. The total path length is resolved by performing a Fourier Transformation on the output of the LFM radar to extract the spectral frequency content. Alternative analysis techniques can involve Prony's method. The output of the Prony's method is capable of extracting frequency, amplitude, phase as well as a damping parameter from a uniformly sampled signal. The utility of the Prony's Method analysis allows parameter extraction in the presence of noise. Prominent spectral peaks indicate the round-trip distance to the various scattering surfaces. It is well established in the art how this processing is performed. Other methods may alternatively be utilized. For example, the radar module can also utilize a Side Scan Radar ("SSW") algorithm to determine the range information to the target. The SSR algorithm can be used alone or in conjunction with trilateration.

Figure 8:
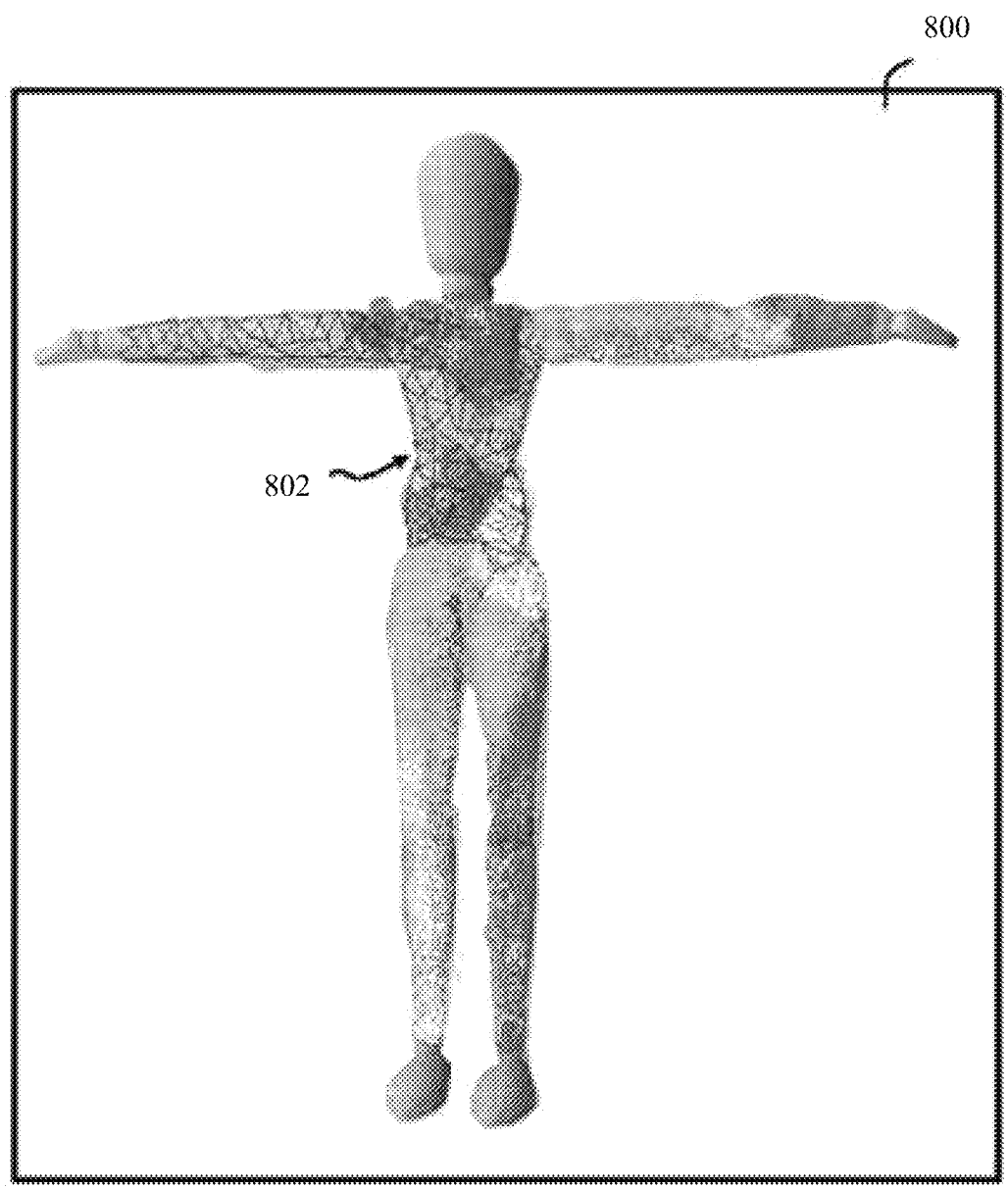
FIG. 8 is a perspective view illustrating a wire mesh mannequin and coverage map.

As the operator scans the individual, a display 800 is updated indicating the regions of coverage, as illustrated in FIG. 8. The operator will see a real-time update of the acquired scan with on-screen indications 802 where areas of the body have been scanned and where the body may still need to be scanned. The display information is useful to assist the operator of the device to make sure that all surfaces of the body have been scanned. A simple illustration of this concept is to show a silhouette of the body in black and white or grayscale to indicate the areas of the body that have been scanned.

In the illustrative application, the handheld scanner system 100 will allow large volumes of fully clothed customers to be rapidly scanned. A significant benefit of this technology is that the handheld scanner system 100 will not be constrained in a fixed orientation with respect to the subject, so challenging measurements can be made to areas of the body which might otherwise be difficult to perform with a fixed structure. Additionally, the combination of two spatial measurement systems working cooperatively can provide a higher fidelity reproduction of the dimensionality of the individual.

While the handheld scanner system 100 is described herein in the context of an exemplary garment fitting application, it is recognized that the handheld scanner system 100 may be utilized to determine size measurements for other irregularly shaped objects and used in other applications that utilize size measurements of an irregularly shaped object.

Figure 9:
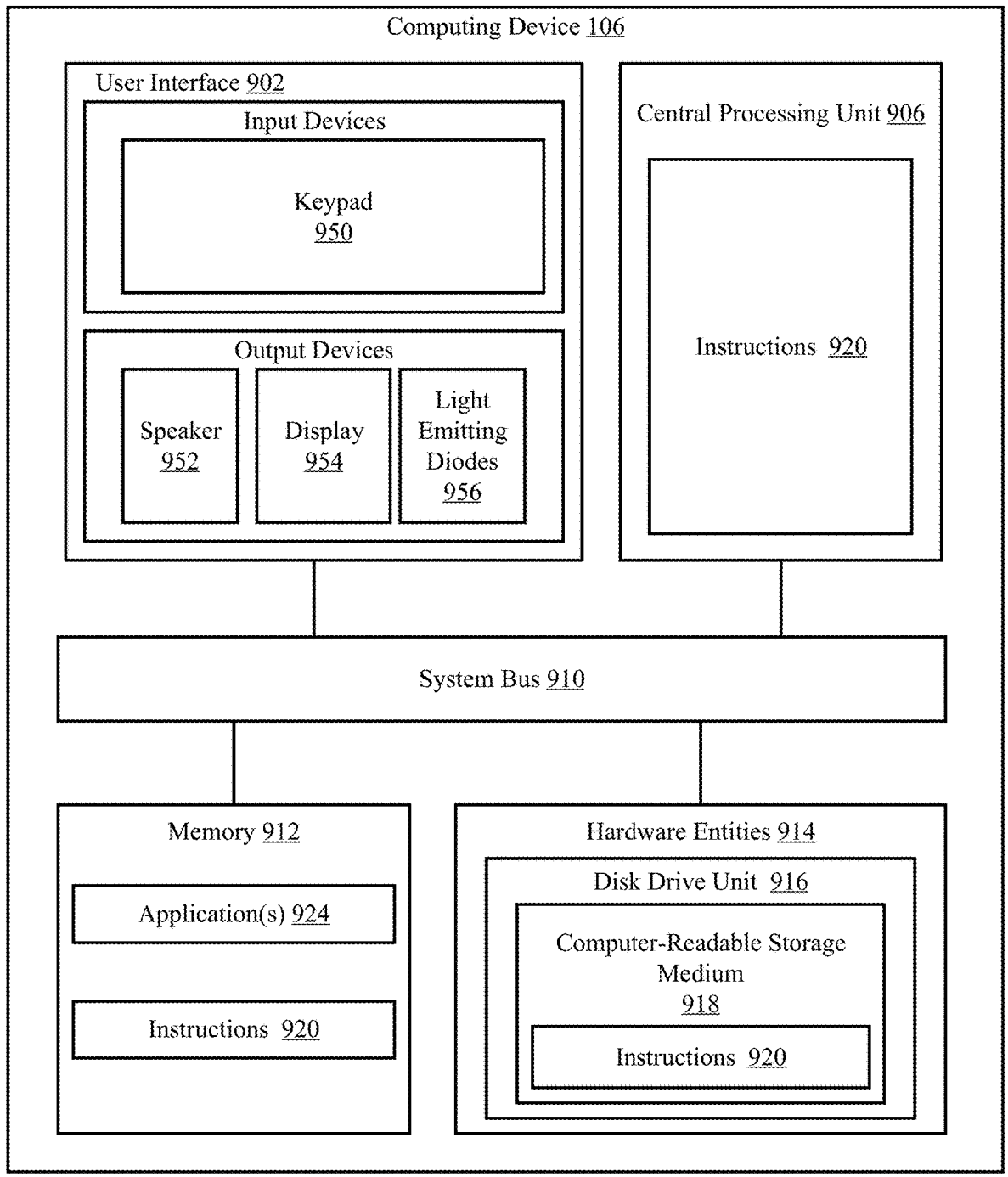
FIG. 9 is an illustration of an illustrative architecture for the computing device shown in FIG. 1.

Referring now to FIG. 9, there is provided a detailed block diagram of an exemplary architecture for a computing device 106. Computing device 106 includes, but is not limited to, a personal computer, a desktop computer, a laptop computer, or a smart device (e.g., a smartphone).

Computing device 106 may include more or less components than those shown in FIG. 9. However, the components shown are sufficient to disclose an illustrative embodiment implementing the present solution. The hardware architecture of FIG. 9 represents one embodiment of a representative computing device configured to facilitate the generation of 3D models using data acquired by the handheld scanner system 100. As such, the computing device 106 of FIG. 9 implements at least a portion of the methods described herein in relation to the present solution.

Some or all the components of the computing device 106 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 106 comprises a user interface 902, a CPU 906, a system bus 910, a memory 912 connected to and accessible by other portions of computing device 106 through system bus 910, and hardware entities 914 connected to system bus 910. The user interface can include input devices (e.g., a keypad 950) and output devices (e.g., speaker 952, a display 954, and/or light emitting diodes 956), which facilitate user-software interactions for controlling operations of the computing device 106.

At least some of the hardware entities 914 perform actions involving access to and use of memory 912, which can be a RAM, and/or a disk driver. Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 106. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 106 and that cause the computing device 106 to perform any one or more of the methodologies of the present disclosure.

Figure 10:
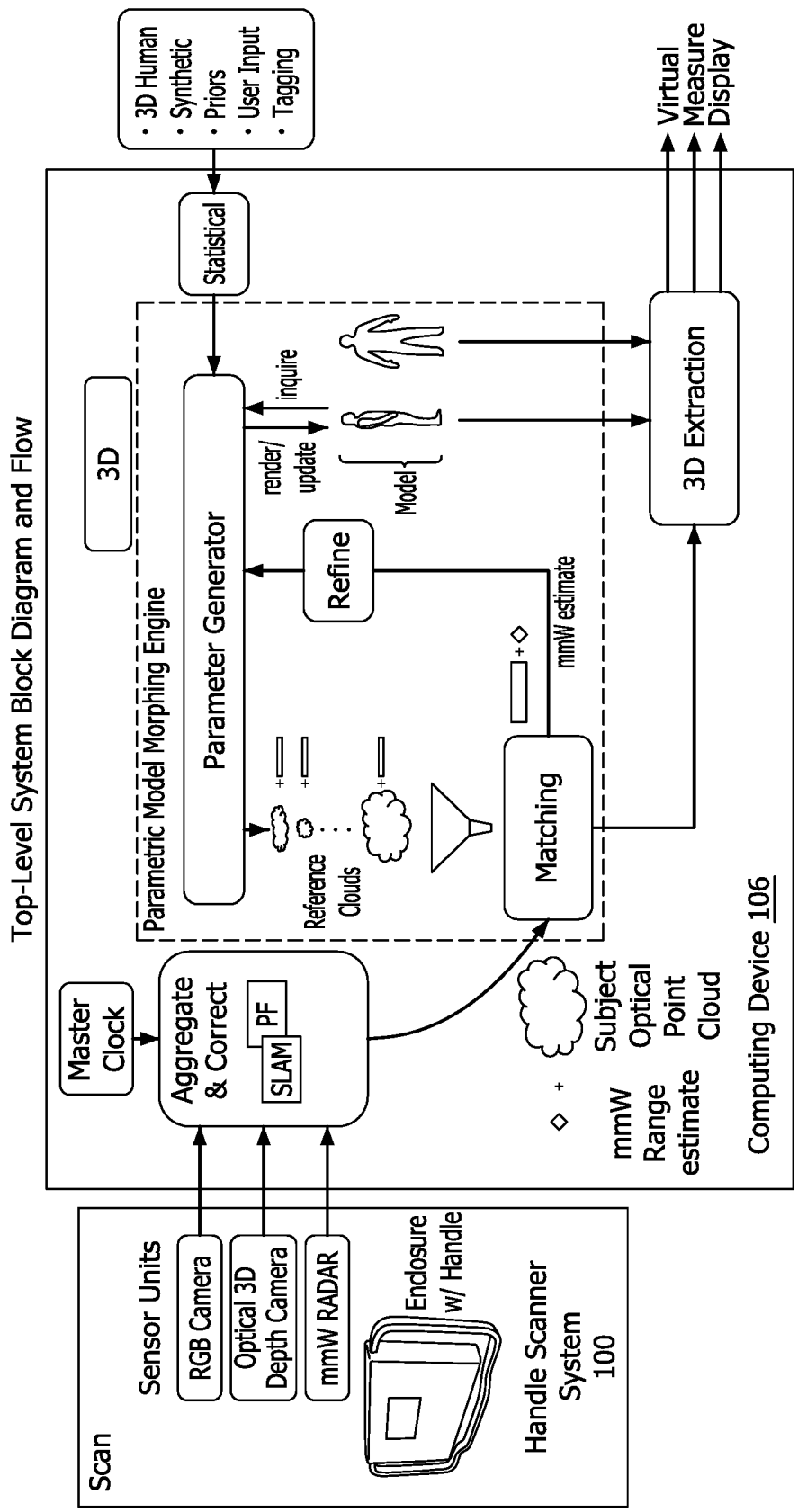
FIG. 10 is an illustration useful for understanding operations of the system shown in FIG. 1.

In some scenarios, the hardware entities 914 include an electronic circuit (e.g., a processor) programmed for facilitating the generation of 3D models using data acquired by the handheld scanner system 100. In this regard, it should be understood that the electronic circuit can access and run one or more applications 924 installed on the computing device 106. The software application(s) 924 is(are) generally operative to: facilitate parametric 3D model building; store parametric 3D models; obtain acquired data from the handheld scanner system 100; use the acquired data to identify a general object class or category in which a scanned object belongs; identify a 3D model that represents an object belonging to the same general object class or category as the scanned object; generate point clouds; modify point clouds; compare point clouds; identify a first point cloud that is a best fit for a second point cloud; obtain a setting vector associated with the first point cloud; set a 3D model using the setting vector; obtain a full 3D surface model and region labeling from the set 3D model; obtain metrics for certain characteristics of the scanned object from the setting vector; refine the metrics; and/or present information to a user. An illustration showing these operations of the computing device is provided in FIG. 10. FIG. 10 also shows the operational relationship between the handheld scanner system and the computing device. Other functions of the software application(s) 924 will become apparent as the discussion progresses.

Illustrative Method for Generating a Refined 3D Model

Referring now to FIG. 11, there is provided a flow diagram of an illustrative method 1100 for producing a refined 3D model using data acquired by a handheld scanner system (e.g. handheld scanner system 100 of FIG. 1). The 3D model has a plurality of meaningful sub-regions. Each meaningful sub-region of the object (e.g., irregularly shaped object 102 of FIG. 1) is identified with a key and associated values (semantic tagging).

Figure 11A:
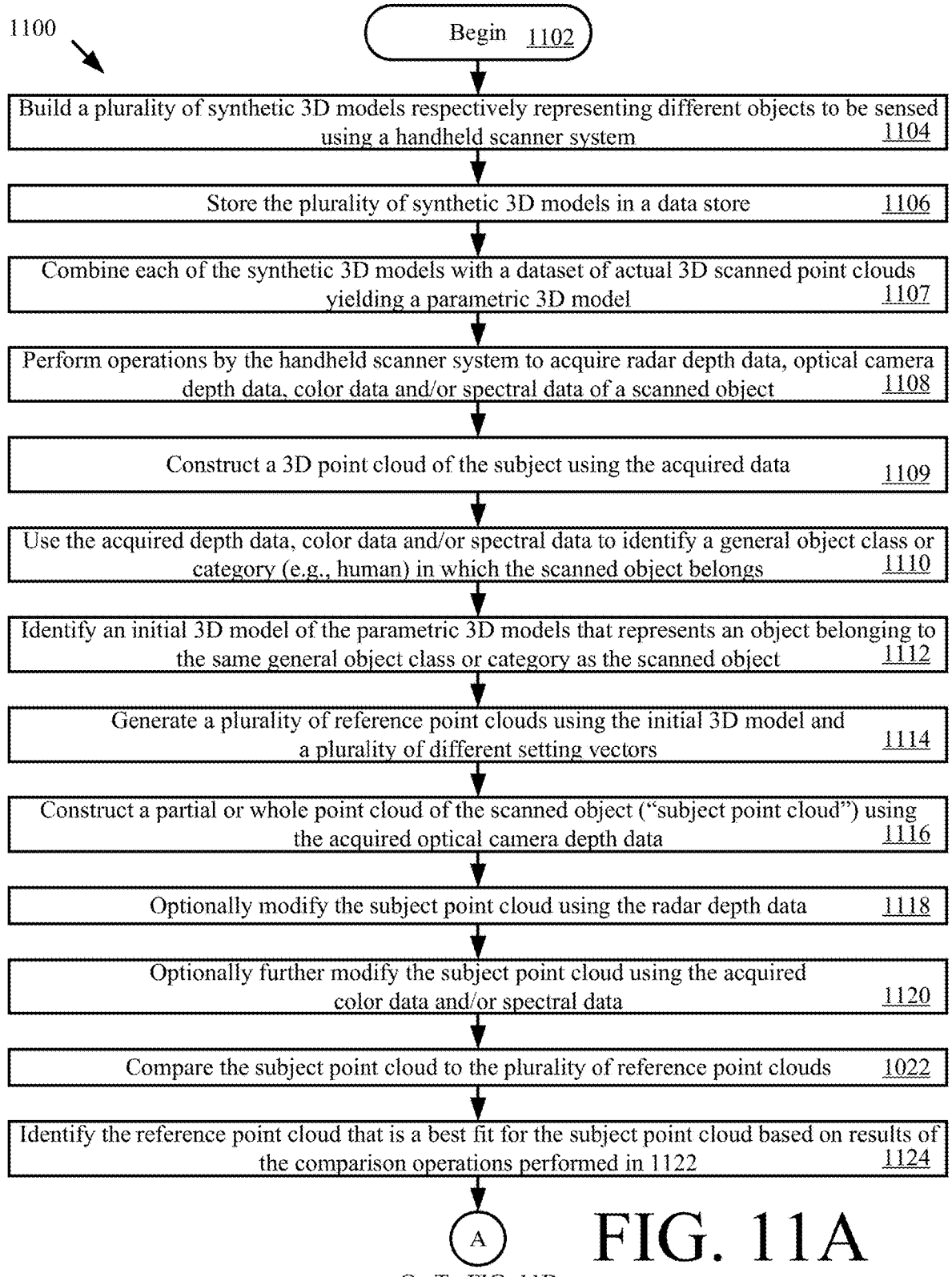
FIGS. 11A-11B (collectively referred to herein as "FIG. 11") is a flow diagram of an illustrative method for producing a 3D model using a handheld scanner system.

Method 1100 comprises a plurality of operations shown in blocks 1102-1144. These operations can be performed in the same or different order than that shown in FIG. 11. For example, the operations of 1116-1118 can be performed prior to 1109-1114, instead of after as shown in FIG. 11A. The present solution is not limited in this regard.

As shown in FIG. 11A, method 1100 begins with 1102 and continues with 1104 where a plurality of synthetic 3D models are built. The synthetic 3D models can be built using a computing device external to and/or remote from the handheld scanner system (e.g., computing device 106 of FIGS. 1 and 9). The computing device includes, but is not limited to, a personal computer, a desktop computer, a laptop computer, a smart device, and/or a server. Each of the listed computing devices is well known in the art, and therefore will not be described herein.

Figure 12:
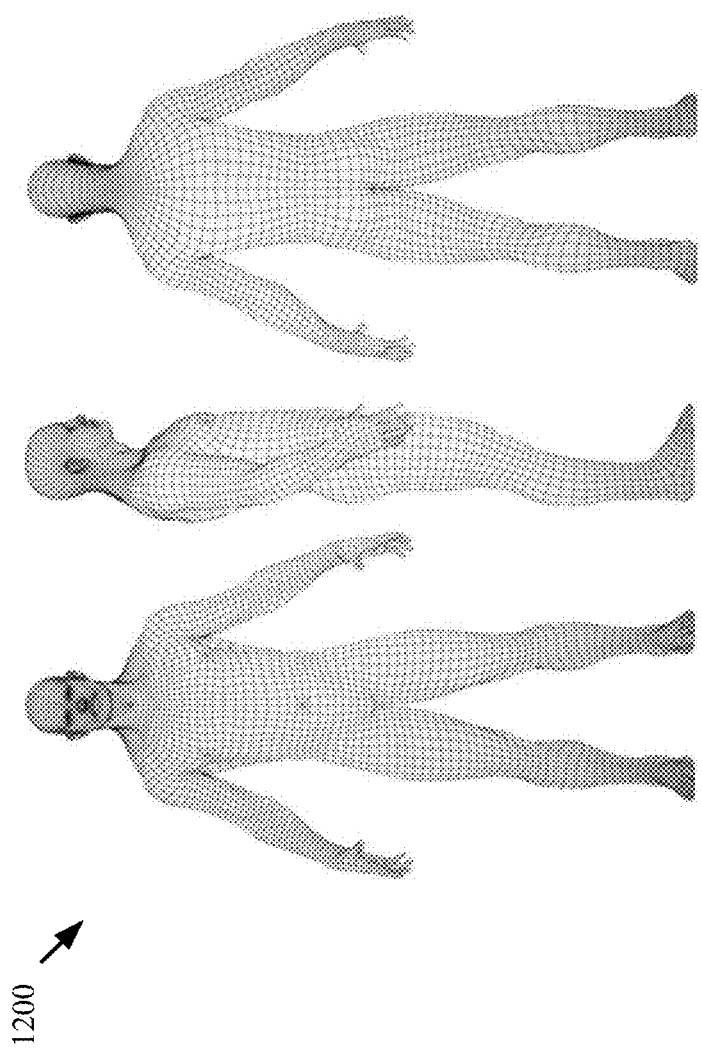
FIG. 12 is an illustration of an illustrative parametric 3D model.
Figure 13:
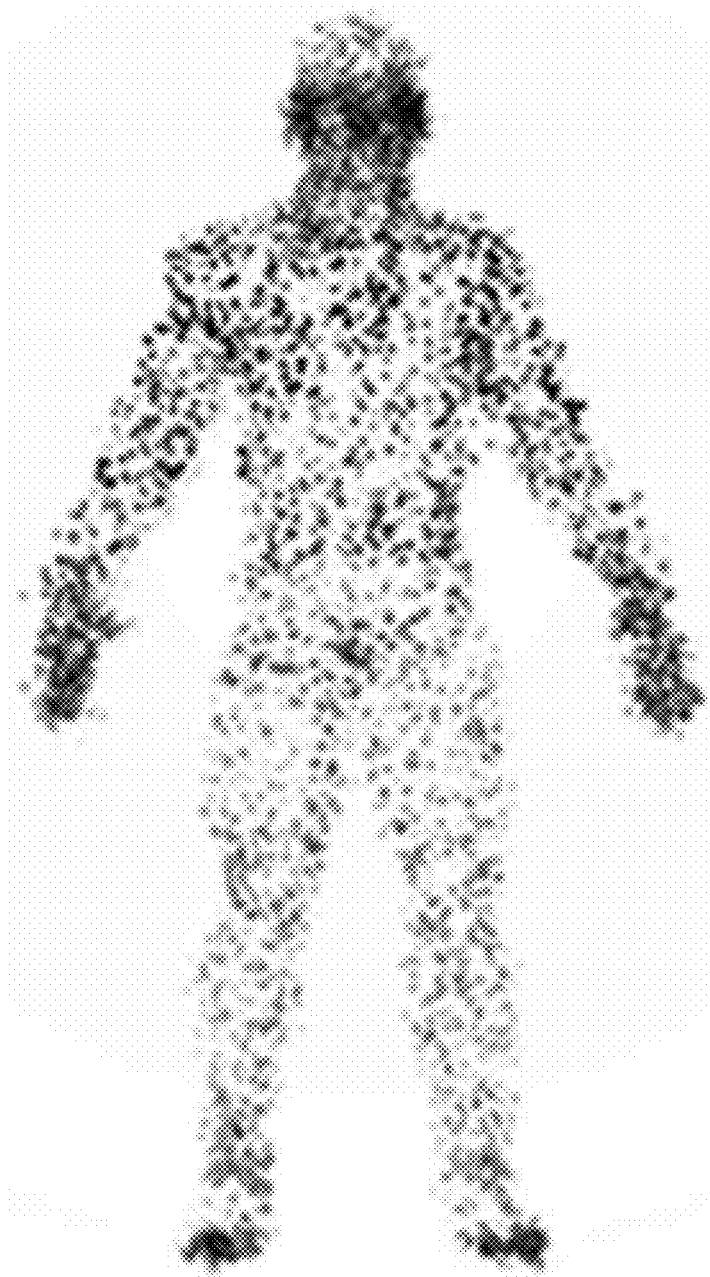
FIG. 13 is an illustration of an illustrative subject point cloud.

The synthetic 3D models represent different objects (e.g., a living thing (e.g., a human (male and/or female) or animal), a piece of clothing, a vehicle, etc.) to be sensed using the handheld scanner system. Methods for building synthetic 3D models are well known in the art. Any known or to be known method for building synthetic 3D models can be used herein without limitation. For example, in some scenarios, the present solution employs a Computer Aided Design ("CAD") software program. CAD software programs are well known in the art. Additionally or alternatively, the present solution uses a 3D modeling technique described in a document entitled "A Morphable Model For The Synthesis Of 3D Faces" which was written by Blanz et al. ("Blanz"). An illustrative synthetic 3D model of a human 1200 generated in accordance with this 3D modeling technique is shown in FIG. 12. The present solution is not limited to the particulars of this example. In next 1106, the plurality of synthetic 3D models are stored in a data store (e.g., memory 422 of FIG. 4, and/or external memory 602 of FIG. 6) for later use.

Each synthetic 3D model has a plurality of changeable characteristics. These changeable characteristics include, but are not limited to, an appearance, a shape, an orientation, and/or a size. The characteristics can be changed by setting or adjusting parameter values (e.g., a height parameter value, a weight parameter value, a chest circumference parameter value, a waist circumference parameter value, etc.) that are common to all objects in a given general object class or category (e.g., a human class or category). In some scenarios, each parameter value can be adjusted to any value from −1.0 to 1.0. The collection of discrete parameter value settings for the synthetic 3D model is referred to herein as a "setting vector". The synthetic 3D model is designed so that for each perceptually different shape and appearance of the given general object class or category, there is a setting vector that best describes the shape and appearance. A collection of setting vectors for the synthetic 3D model describes a distribution of likely shapes and appearances that represent the distribution of those appearances and shapes that are likely to be found in the real world. This collection of setting vectors is referred to herein as a "setting space".

A synthetic 3D model may also comprise a plurality of sub-objects or regions (e.g., a forehead, ears, eyes, a mouth, a nose, a chin, an arm, a leg, a chest, hands, feet, a neck, a head, a waist, etc.). Each meaningful sub-object or region is labeled with a key-value pair. The key-value pair is a set of two linked data items: a key (which is a unique identifier for some item of data); and a value (which is either the data that is identified or a pointer to a location where the data is stored in a datastore). The key can include, but is not limited to, a numerical sequence, an alphabetical sequence, an alpha-numeric sequence, or a sequence of numbers, letters and/or other symbols.

Referring again to FIG. 11A, method 1100 continues with 1107 where each of the synthetic 3D models are combined with a dataset of actual 3D scanned point clouds yielding a parametric 3D model. In one instance, (some of) the dataset of 3D scanned point clouds of actual (real) objects can be obtained by the handheld scanner system 100.

Next in 1108, an operator of the handheld scanner system scans an object (e.g., an individual) in a continuous motion. Prior to the scanning, additional physical features may be added to the subject's real surface to facilitate better and faster subsequent creation of a subject point cloud using scan data. For example, the subject may wear a band with a given visible pattern formed thereon. The band is designed to circumscribe or extend around the object. The band has a width that allows (a) visibility of a portion of the object located above the band and (b) visibility of a portion of the object located below the band. The visible pattern of the band (e.g., a belt) facilitates faster and more accurate object recognition in point cloud data, shape registration, and 3D pose estimation. Accordingly, the additional physical features improve the functionality of the implementing device.

As a result of this scanning, the handheld scanner system performs operations to acquire radar depth data (e.g., via radar module 416 of FIG. 4), optical camera depth data (e.g., via camera(s) 424 of FIG. 4), color data (e.g., via camera(s) 424 of FIG. 4), and/or spectral data (e.g., via camera(s) 424 of FIG. 4) of a scanned object (e.g., a person). The acquired data is stored in a data store local to the handheld scanner system or remote from the handheld scanner system (e.g., data store 110 of FIG. 1). In this regard, 1108 may also involve communicating the acquired data over a network (e.g., network 108 of FIG. 1) to a remote computing device (e.g., computing device 106 of FIGS. 1 and 9) for storage in the remote data store.

The acquired data is used in 1109 to construct a 3D point cloud of the subject. The term "point cloud", as used herein, refers to a set of data points in some coordinate system. In a 3D coordinate system, these points can be defined by X, Y and Z coordinates. More specifically, optical keypoints are extracted from optical data. In one scenario, these keypoints can be extracted using, but not limited to, ORB features. The keypoints are indexed and used to concatenate all scanned data into a 3D point cloud of the subject. These keypoints are also used to (continuously) track the position (rotation and translation) of the handheld scanner system 100 relative to a fixed coordinate frame. Since the number and quality of keypoints depends on the scan environment, it may occur that the handheld scanner system 100 cannot collect enough keypoints and fail to construct the 3D point cloud. To resolve this issue, an additional layer can be applied to the subject's real surface to guarantee the amount and type of keypoints. This layer can be some patterns (on a belt) worn by or projected on the subject.

In 1110, the acquired data is used to identify a general object class or category (e.g., human) in which the scanned object belongs. For example, image processing is used to recognize an object in an image and extract feature information about the recognized object (e.g., a shape of all or a portion of the recognized object and/or a color of the recognized object) from the image. Object recognition and feature extraction techniques are well known in the art. Any known or to be known object recognition and feature extraction technique can be used herein without limitation. The extracted feature information is then compared to stored feature information defining a plurality of general object classes or categories (e.g., a human, an animal, a vehicle, etc.). When a match exists (e.g., by a certain degree), the corresponding general object class or category is identified in 1110. The present solution is not limited to the particulars of this example. The operations of 1110 can be performed by the handheld scanner system 100 and/or the remote computing device (e.g., computing device 106 of FIGS. 1 and 9).

Next in 1112, an initial 3D model is identified from the plurality of parametric 3D models that represents an object belonging to the same general object class or category (e.g., human) of the scanned object. Methods for identifying a 3D model from a plurality of 3D models based on various types of queries are well known in the art, and will not be described herein. Any known or to be known method for identifying 3D models can be used herein without limitation. One such method is described in a document entitled "A Search Engine For 3D Models" which was written by FunkHouser et al. ("FunkHouser"). The operations of 1112 can be performed by the handheld scanner system 100 and/or the remote computing device (e.g., computing device 106 of FIGS. 1 and 9).

The initial 3D model and a plurality of different setting vectors are used in 1114 to generate a plurality of reference point clouds. Methods for generating point clouds are well known in the art. Any known or to be known method for generating point clouds can be used herein without limitation. An illustrative reference point cloud 1200 is shown in FIG. 12. The operations of 1114 can be performed by the handheld scanner system 100 and/or the remote computing device (e.g., computing device 106 of FIGS. 1 and 9).

Figure 14:
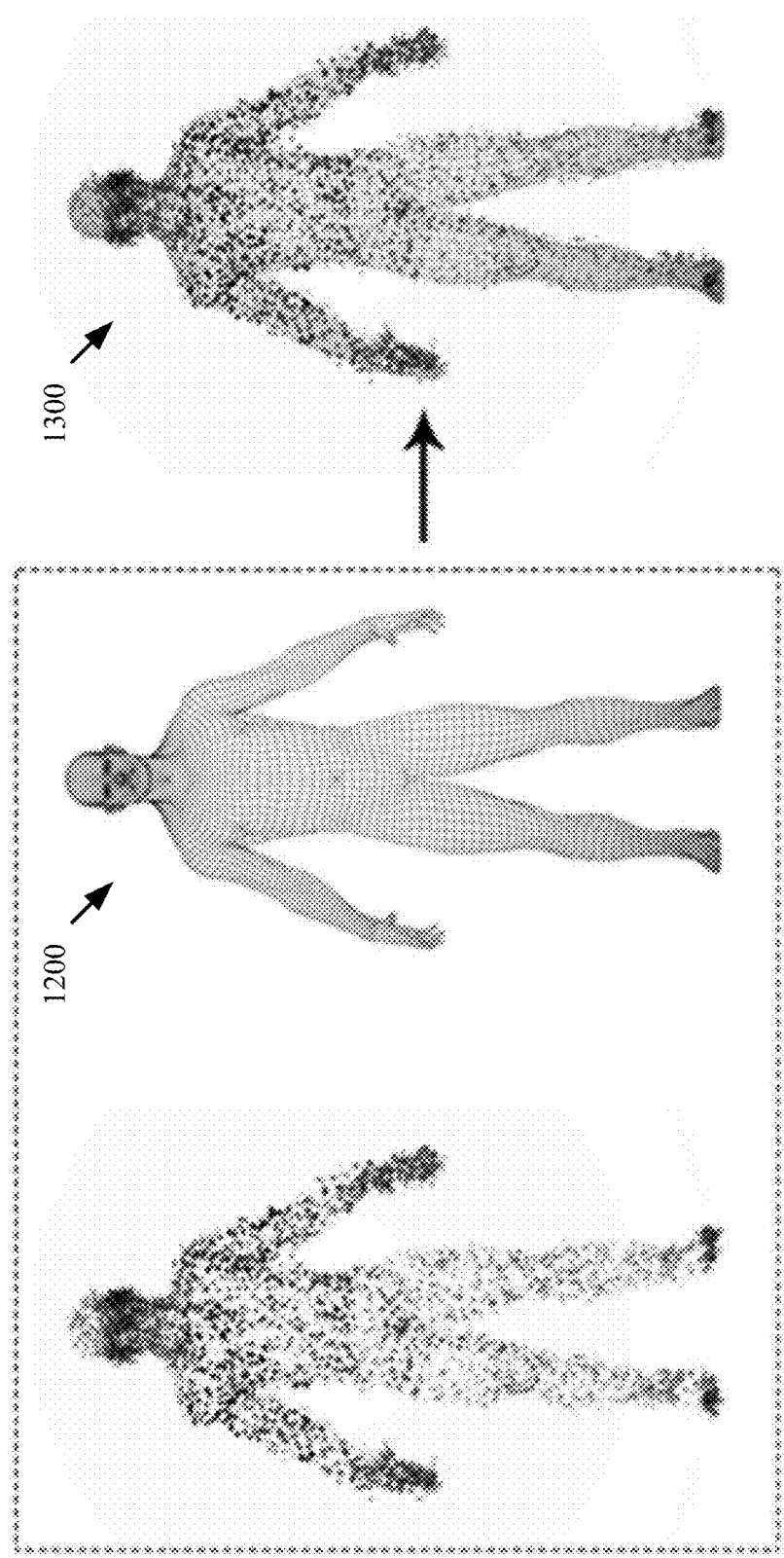
FIG. 14 shows an illustrative process for morphing a reference point cloud to a sensed subject point cloud using parametric 3D model and setting vectors.

Thereafter in 1116, a partial or whole point cloud of the scanned object ("subject point cloud") is constructed using the acquired optical camera depth data. An illustrative subject point cloud is shown in FIG. 14.

The subject point cloud can be optionally modified using the radar depth data as shown by 1118, the color data as shown by 1120, and/or the spectral data as also shown by 1120. Methods for modifying point clouds using various types of camera based data are well known in the art, and therefore will not be described herein. Any known or to be known method for modifying point clouds using camera based data can be used herein without limitation. The operations of 1116-1120 can be performed by the handheld scanner system 100 and/or the remote computing device (e.g., computing device 106 of FIGS. 1 and 9).

1118 is an important operation since it improves the accuracy of the subject point cloud. As noted above, a radar can "see through" the clothes since GHz frequencies reflect of the water in the skin. Radar depth measurements are registered with optical camera data to identify spots or areas on the subject being scanned to which the radar distance was measured from the device. As a result, the final scanned point cloud comprises such identified radar spots besides the optical point cloud. The radar point cloud can be used to reconstruct a 3D radar representation of the object's body. These radar spots can then also be used to modify the optical point cloud obtained with something covering at least a portion of the object (e.g., clothing) and/or to modify a reference point cloud (e.g., human model) to best fit the subject's real shape. Since the modified cloud better represents the subject's real shape (e.g., human body without clothing) compared to the optical cloud (with clothing), it improves the process of identifying and morphing the reference point cloud to obtain a better refined 3D model as illustrated in 1122-1132, and thus better fit the subject's real shape. The difference between the optical distances and radar distances in labeled regions can be further utilized to obtain more accurate metrics for certain characteristics of the scanned object (e.g., chest circumference, and/or waist circumference) as illustrated in 1134.

In 1122, the subject point cloud is then compared to the plurality of reference point clouds. A reference point cloud is identified in 1124 based on results of these comparison operations. The identified reference point cloud (e.g., reference point cloud 1200 of FIG. 12) is the reference point cloud that is a best fit for the subject point cloud. Best fit methods for point clouds are well known in the art. Any known or to be known best fit method for point clouds can be used herein without limitation. Illustrative best fit methods are described in: a document entitled "Computer Vision and Image Understanding" which was written by Bardinet et al.; and a document entitled "Use of Active Shape Models for Locating Structures in Medical Images" written by Cootes. The operations of 1122-1124 can be performed by the handheld scanner system 100 and/or the remote computing device (e.g., computing device 106 of FIGS. 1 and 9). Also, the operations of 1122-1124 can alternatively be performed before the radar modification of the subject point cloud in 1118.

Figure 11B:
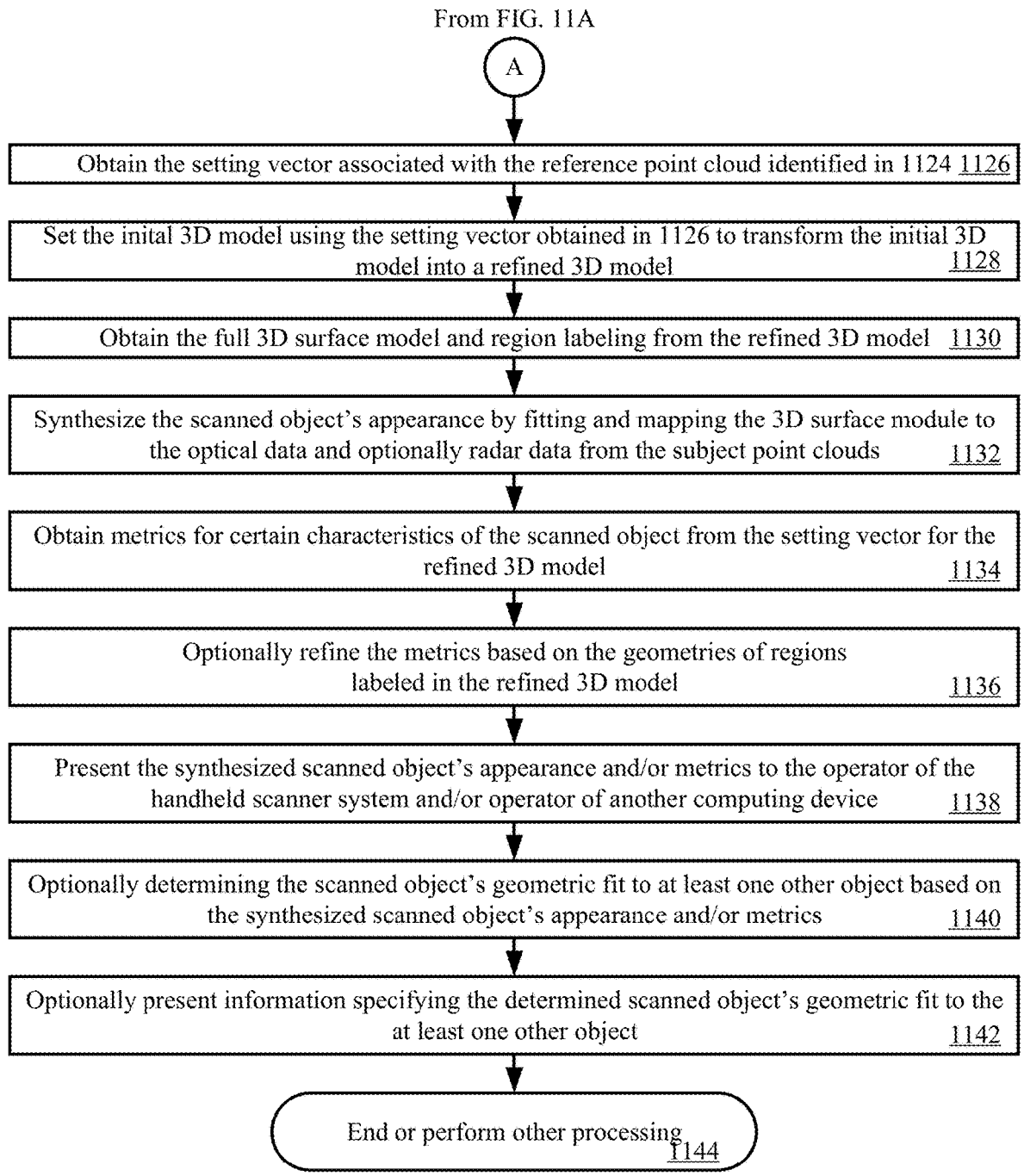

Once the best fit reference point cloud is identified, method 1100 continues with 1126 of FIG. 11B. As shown in FIG. 11B, 1126 involves obtaining the setting vector associated with the best fit reference point cloud. The initial 3D model is then transformed into a refined 3D model in 1128. The refined 3D model is an instance of a parametric 3D model which better fits the subject point cloud. This transformation is achieved by setting the changeable parameter values of the initial 3D model to those specified in the setting vector. The set initial 3D model describes the appearance and shape change for that setting vector. The set initial 3D model still comprises the labeling for meaningful sub-objects or regions. The operations of 1126-1128 can be performed by the handheld scanner system 100 and/or the remote computing device (e.g., computing device 106 of FIGS. 1 and 9).

Figure 15:
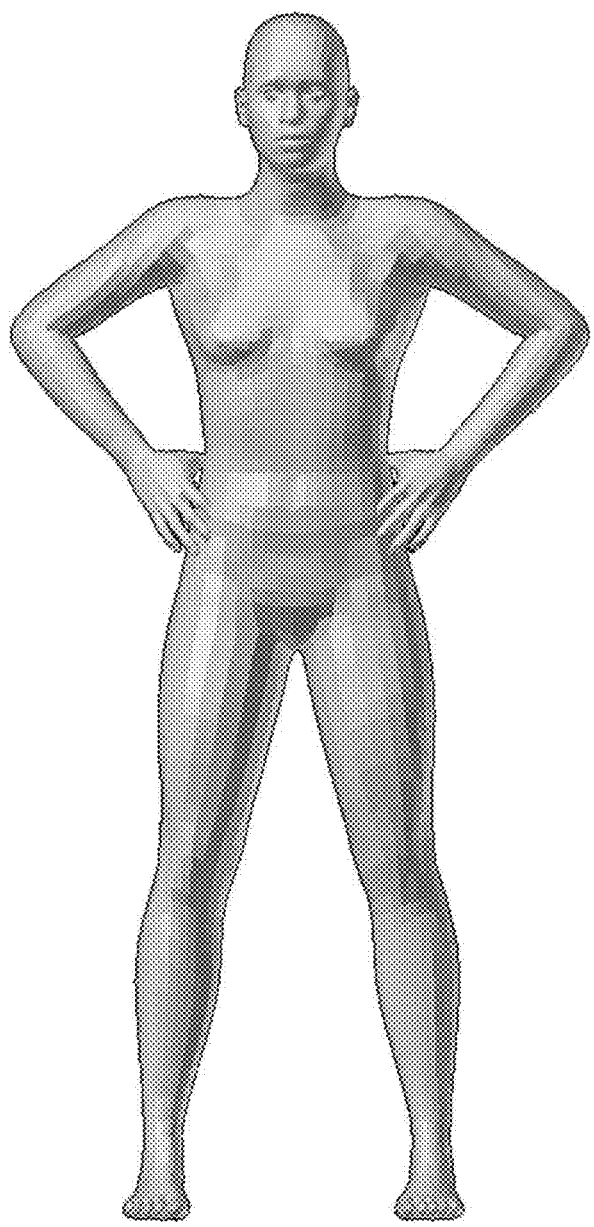
FIG. 15 is an illustration of an illustrative synthesized surface model.

In 1130, a full 3D surface model and region labeling is obtained from the refined 3D model. Surface modeling techniques are well known in the art, and therefore will not be described herein. Any known or to be known surface modeling technique can be used herein without limitation. In some scenarios, a CAD software program is employed in 1130 which has a surface modeling functionality. An illustrative surface model is shown in FIG. 15. The operations of 1130 can be performed by the handheld scanner system 100 and/or the remote computing device (e.g., computing device 106 of FIGS. 1 and 9).

The scanned object's appearance is synthesized in 1132. The synthetization is achieved by fitting and mapping the 3D surface module to the optical data and optionally radar data from the subject point clouds (optical and/or radar clouds, 3D radar reconstructed cloud). The phrase "fitting and mapping" as used herein means finding correspondence between points in the 3D surface model and points in the subject point cloud and optionally modifying the 3D surface module to best fit the subject point clouds. Metrics for certain characteristics of the scanned object (e.g., height, weight, chest circumference, and/or waist circumference) are obtained in 1134 from the setting vector for the refined 3D model. The metrics may optionally be refined (a) using radar data associated with labeled regions of the refined 3D model, and/or (b) based on the geometries of regions labeled in the refined 3D model, as shown by 1136. The synthesized appearance of the scanned object is presented to the operator of the handheld scanner system and/or to a user of another computing device (e.g., computing device 106 of FIGS. 1 and 9), as shown by 1138. In some scenarios, the synthesized appearance of the scanned object is the same as the surface model shown in FIG. 15.

The synthesized scanned object's appearance and/or metrics (unrefined and/or refined) can optionally be used in 940 to determine the scanned object's geometric fit to at least one other object (e.g., a shirt or a pair of pants) or to identify at least one other object which fits on the scanned object. In optional 1142, further information is presented to the operator of the handheld scanner system and/or to a user of another computing device (e.g., computing device 106 of FIGS. 1 and 9). The further information specifies the determined scanned object's geometric fit to the at least one other object and/or comprises identifying information for the at least one other object. For example, clothing suggestions for the scanned individual are output from the handheld scanner system and/or another computing device (e.g., a personal computer, a smart phone, and/or a remote server). Subsequently, 1144 is performed where method 1100 ends or other processing is performed (e.g., return to 1104).

The present solution is not limited to the particulars of FIG. 11. For example, in some scenarios, a neighborhood of reference point clouds is identified. An interpolated reference vector is accumulated from contributions of the associated neighbor reference vectors. The initial 3D model is set using the interpolated reference vector. The set initial 3D model describes the appearance and shape change for the interpolated reference vector. The region labeling continues to refer to the transformed sub-regions. The full 3D surface model and region labeling is then obtained from the set initial 3D model.

The following operations of the above described method 1100 are considered novel: using the object class to select a 3D parametric model from a plurality of 3D parametric models; finding a setting vector that fits the 3D parametric model to the sensed unstructured data using the setting vector's association with a reference point cloud found by a spatial hash; using a neighborhood of found setting vectors to further refine the shape and appearance of the 3D parametric model; and/or returning an appearance model as well as semantic information for tagged regions in the 3D parametric model.

Illustrative Method for Improved Scanning Coverage and Efficiency

As discussed above, the handheld scanner system 100 utilizes optical and radar technology to scan a clothed subject 102. The optical camera (e.g., optical camera 424 of FIG. 4) is used to determine the basic shape of the clothed subject 102. The shape information is then used to optimize the algorithm for the radar sensor shape behind the clothing so that measurements can be determined more accurately.

When an operator is scanning a subject, the optical information can be seen on the screen. The operator uses the optical information to move the scanner over the subject so a 3D image of the subject can be rendered. However, while the operator can view the optical information in the display, the operator has no information about the quality of the radar sensor data. It is difficult to determine if the operator has captured a sufficient amount of radar data over the entire subject without a visual aid. Thus, the present solution uses augmented reality to add information to the optical display to assist the operator by improving the quality of the radar data.

Figure 16:
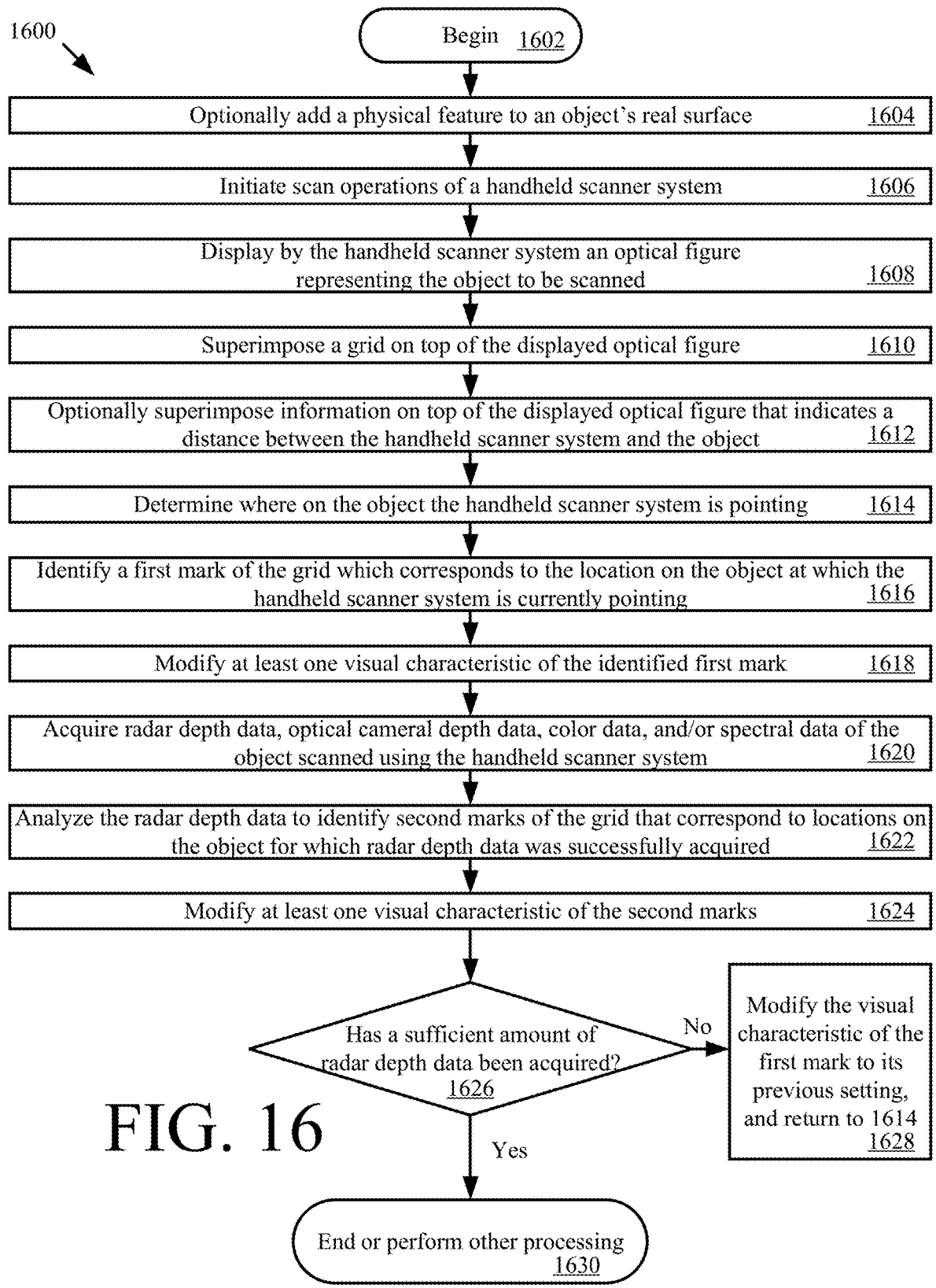
FIG. 16 is a flow diagram of an illustrative method for scanning an object.

Referring now to FIG. 16, there is provided an improved method 1600 for scanning an object or subject. Method 1600 can be performed in 1108 of FIG. 11. Method 1600 can include some or all of the operations shown in FIG. 16. The operations may be performed in the same or different order than that shown in FIG. 16. In method 1600, operations are generally performed by the handheld scanner system (e.g., handheld scanner system 100 of FIG. 1) to acquire radar depth data, optical camera depth data, color data and/or spectral data of a scanned object.

As shown in FIG. 16, method 1600 begins with 1602 and continues with 1604 where a physical feature is optionally added to the object's or subject's real surface. The physical feature can be added to facilitate better and faster subsequent creation of a subject point cloud using scan data. For example, the subject may wear a band with a given visible pattern formed thereon. The band is designed to circumscribe or extend around the object. The band has a width that allows (a) visibility of a portion of the object located above the band and (b) visibility of a portion of the object located below the band. The visible pattern of the band (e.g., a belt) facilitates faster and more accurate object recognition in point cloud data, shape registration, and 3D pose estimation. Accordingly, the additional physical features improve the functionality of the implementing device.

In 1606, scan operations of the handheld scanner system are initiated (e.g., via actuation of a physical or virtual button). The handheld scanner system displays an optical figure representing the object to be scanned as shown by 1608. A grid is superimposed on top of the displayed optical figure in 1610. The optical figure may be a 3D optical figure (e.g., a 3D optical figure representing a human).

Figure 17:
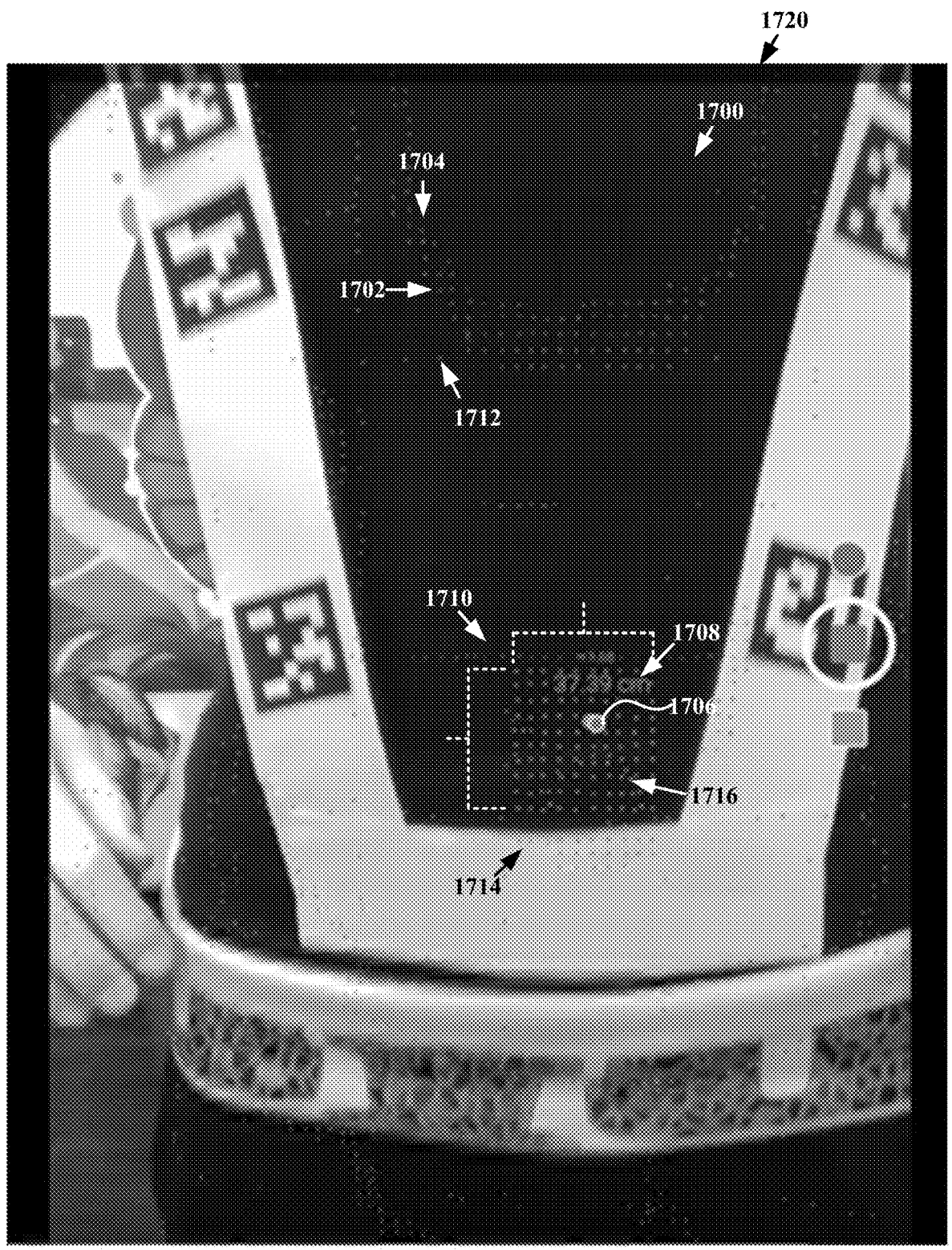
FIGS. 17-19 each provides an image showing a grid overlaid on top of an optical image of a subject.

An image of an illustrative grid 1700 superimposed on top of a displayed optical FIG. 1720 is provided in FIG. 17. The grid 1700 comprises a plurality of rows 1702 and a plurality of columns 1704 defining grid areas 1710. The lines of the grid defining cells in the rows and columns are shown in a transparent format. A plurality of marks 1712 are provided in each row, column and/or grid area of the grid 1700. Although the marks 1712 are shown as colored dots, the present solution is not limited in this regard. The marks 1712 can have any shape and/or color. The shape and/or color of the marks 1712 can be selectively changed when radar data for a corresponding area of the subject has been successfully acquired. For example, the marks are shown in a dark color (e.g., black) when radar information has not yet been acquired for the corresponding location on the subject. The marks are shown in a medium or light color (e.g., green or white) when radar information has been successfully acquired for the corresponding location on the subject. The present solution is not limited to the particulars of this example.

Optionally, a reference point cloud from the plurality of reference point clouds can be identified based on basic information of scanned subject (e.g., height and weight for human scanning) and the accumulated optical cloud can be then aligned to the reference point cloud to provide feedback and information to help guide operators including but not limited to information about regions of interest (regions that need radar scan), guides for scanning directions and device orientations, etc. Methods to align the 3D (optical) point cloud to the reference point cloud are well known in the art. One such method is an Iterative Closest Point ("ICP") algorithm.

Referring again to FIG. 16, information is also optionally superimposed on top of the optical figures in 1612 that indicates a distance between the handheld scanner system and the object. An image of illustrative distance information 1708 superimposed on top of the optical FIG. 1720 is provided in FIG. 17. The displayed optical FIG. 1720, grid 1700 and/or distance information 1708 is(are) used by the operator of the handheld scanner system 100 to assist in the scanning process.

Next in 1614, operations are performed by the handheld scanner system to determine where on the object the handheld scanner system is pointing for scanning purposes. The physical feature added in 1604 can facilitate this determination. Once this determination has been made, a first mark of the grid is identified as the mark corresponding to the location on the object at which the handheld scanner system is currently pointing, as shown by 1616. At least one visual characteristic (e.g., size and/or color) of the first mark is modified in 1618.

An image showing a mark 1706 that has been modified to indicate a pointing direction of the handheld scanner system relative to the object is provided in FIG. 17. As shown in FIG. 17, mark 1706 has been enlarged and shown in a relatively light color (e.g., green or white) so that it is visually distinguishable for the other marks of the grid 1700. The present solution is not limited to the particulars of this example. The mark 1706 can alternatively or additionally be modified so as to have a different color than the other marks and/or to have a different shape than the other marks.

Referring again to FIG. 16, method 1600 continues with 1620 where radar depth data, optical camera depth data, color data, and/or spectral data of the object is acquired by the handheld scanner system as the object is being scanned. The radar data is analyzed in 1622 to identify second marks of the grid that correspond to locations on the object for which radar depth data was successfully acquired in 1620. At least one visual characteristic (e.g., color) of the second marks is modified in 1624. An image showing modified second marks 1714 is provided in FIG. 17. As shown in FIG. 17, the color of the second marks 1714 has been changed from a dark color (e.g., black) to a lighter color (e.g., gray or green). Additional marks 1716 are also added to the grid to illustrate a successful radar depth data acquisition for a given area of the object. The present solution is not limited to the particulars of FIG. 17.

Next, a decision is made in 1626 of FIG. 16 as to whether a sufficient amount of radar depth data has been acquired. If so [1626:YES], then 1630 is performed where method 1600 ends or other processing is performed.

If not [1626:NO], then 1628 is performed where the visual characteristic of the first mark is modified to its previous setting. For example, the size of the first mark is reduced and/or the color of the first mark is changed back to the darker color so that the first mark is no longer distinguishable from the other marks. There may be a time delay from when the handheld scanner system changes its pointing direction and when the first mark's visual characteristic is modified in 1628. This can be useful for showing an operator the handheld scanner system's movement over a given period of time. Subsequently, method 1600 returns to 1614 so that the scanning process can be repeated from another area of the object.

Figure 18:
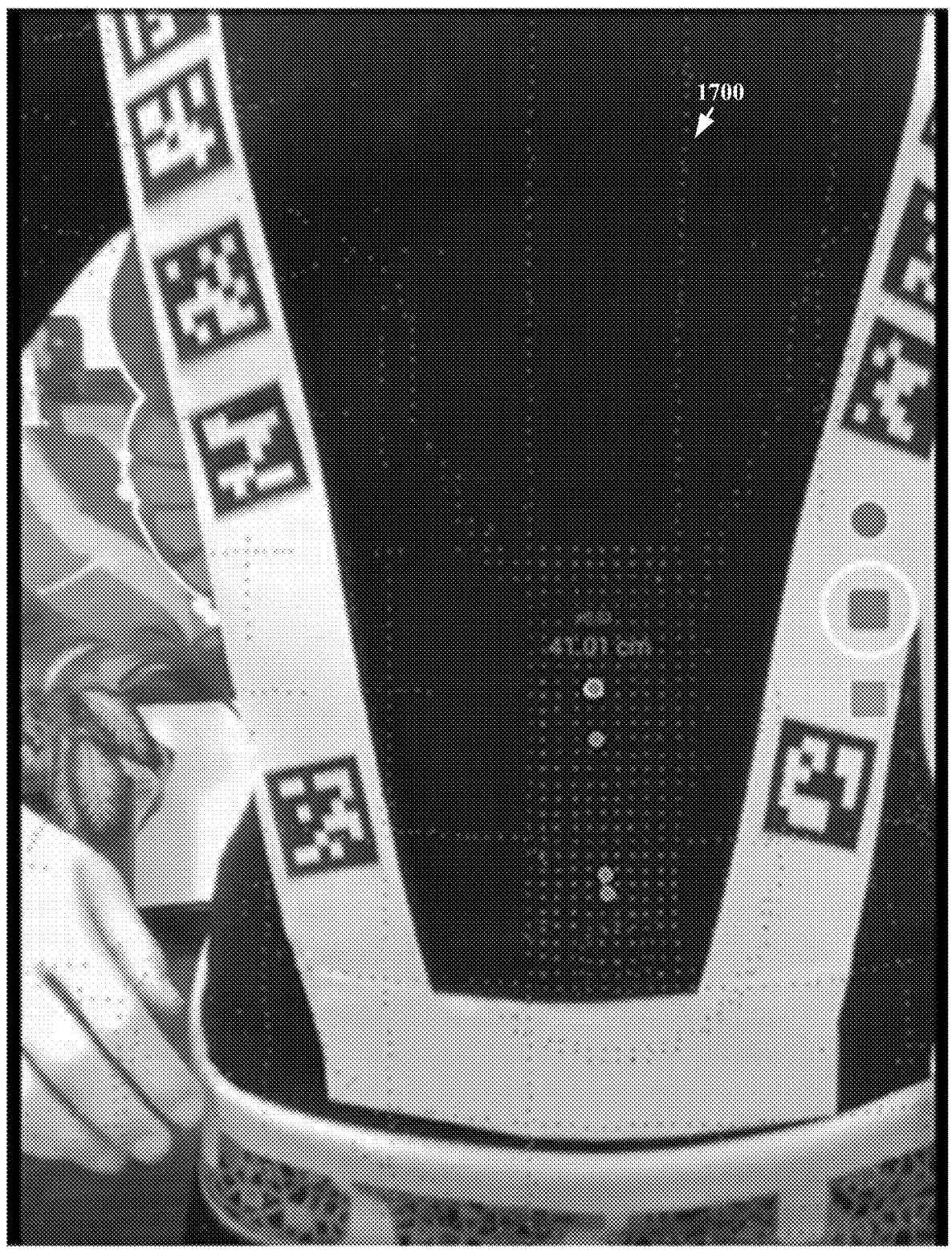
Figure 19:
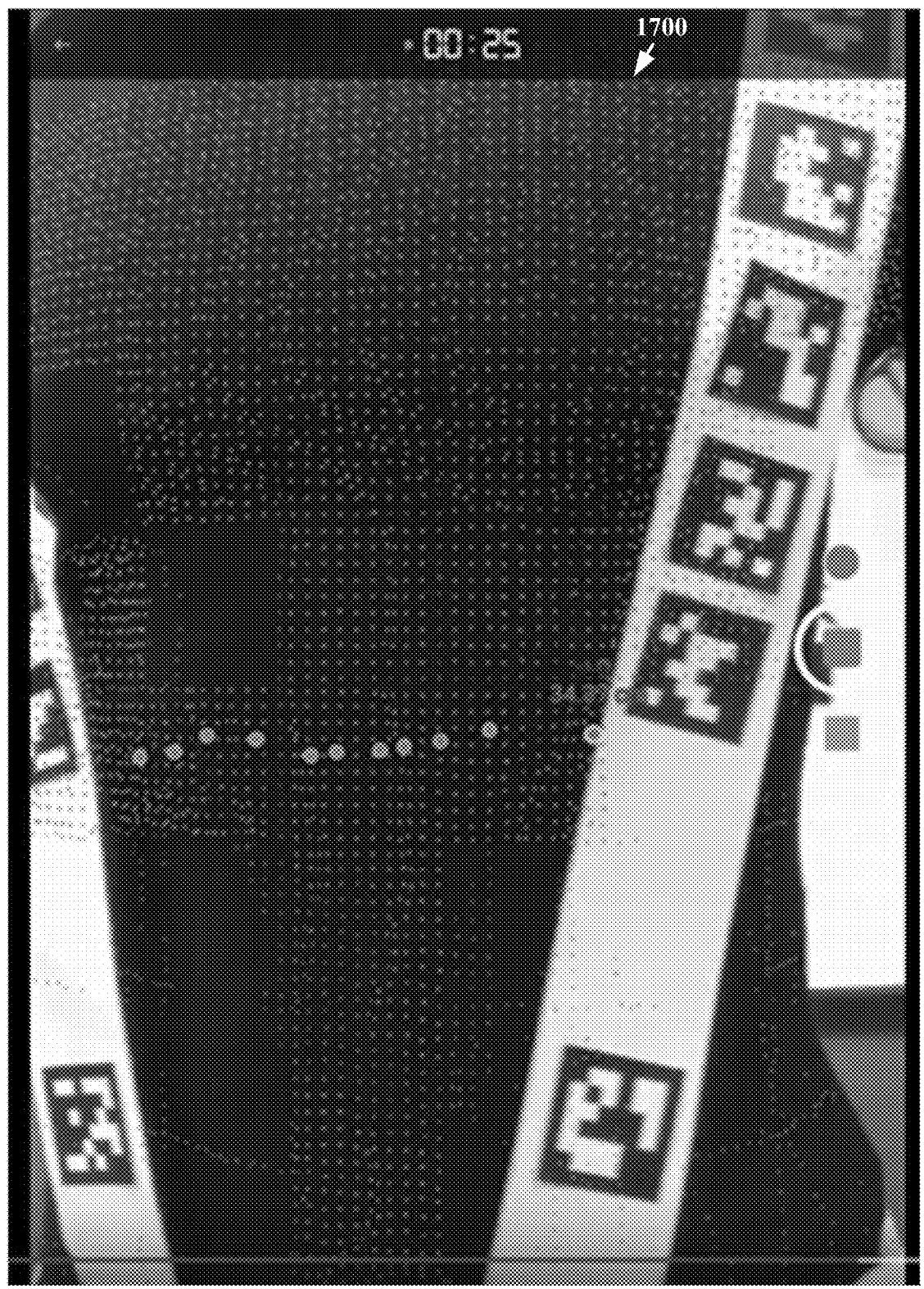

Referring now to FIGS. 18-19, illustrations are provided which show the grid 1700 having an increased number of marks modified to indicate that radar data was successfully obtained for the corresponding locations on the subject.

Once the subject is completely scanned, the optical data is used to create a 3D image of the person clothed as discussed above in relation to FIG. 11. This optical 3D reconstruction does not rely on the grid information. The radar information is then used to create a new 3D image within (behind) the outline of the clothing. The grid assisted scan creates a more dense and consistent radar pattern. The radar pattern is used to create a more accurate body image that significantly improves the measurement accuracy.

Figure 20:
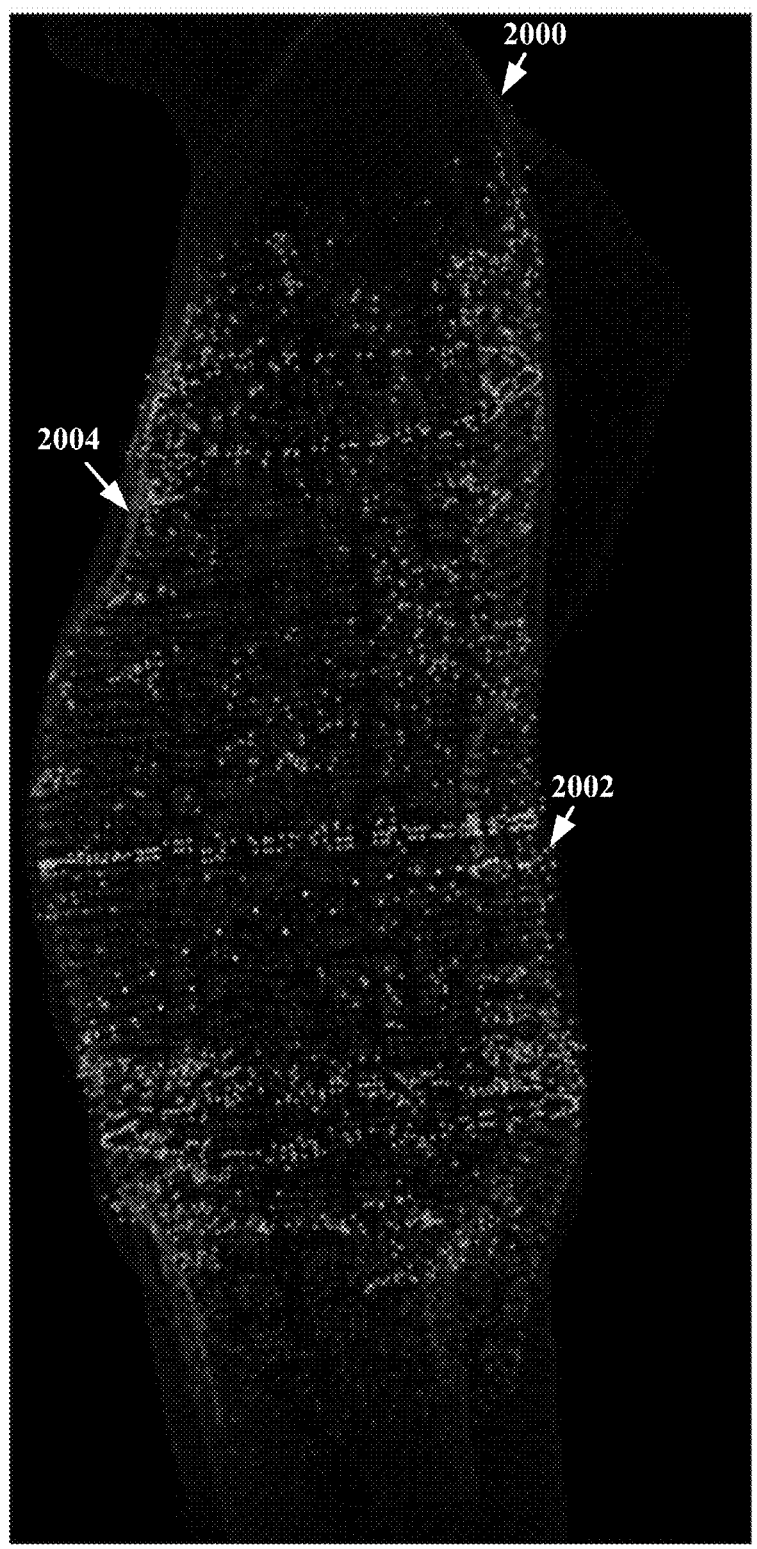
FIG. 20 provides an illustration showing a first point cloud representing information created from the optical data, a second point cloud representing information created from the radar sensor, and a third point cloud representing information created from both the optical and radar data.

FIG. 20 shows 3D point clouds. A first point cloud 2000 represents information created from the optical data. A second point cloud 2002 represents information created from the radar sensor. A third point cloud 2004 represents information created from both the optical and radar data. The separation between the first and third point clouds clearly show the clothing line and the skin line.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for obtaining sizing of an irregularly shaped object, comprising:
   displaying, by a display of a handheld scanner system, a 3D optical figure of a subject;
   displaying a 2D grid superimposed over the 3D optical figure of the subject, the 2D grid comprising lines defining a plurality of 2D cells arranged in rows and columns;
   providing a mark within each of the plurality of 2D cells, the mark being exclusive of data defining the 3D optical figure;
   generating, by a radar module of the handheld scanner system, range data specifying a sensed spacing between the radar module and at least a surface of a first portion of the irregularly shaped object which is covered by at least one item;
   receiving, by a processor of the handheld scanner system, the range data from the radar module as the subject is being scanned;
   analyzing, by the processor, the range data to identify at least one first mark of the marks provided in the plurality of 2D cells that corresponds to a location on the subject for which radar depth data was received; and
   causing, by the processor, the radar module to generate an optimized radar pattern based on variations of at least one first visual characteristic of the first mark.

2. The method according to claim 1, further comprising generating, by an optical module of the handheld scanner system, a 3D point cloud data representing a surface of at least one item covering at least a first portion of the irregularly shaped object, and a surface of a second portion of the irregularly shaped object's surface which is exposed.

3. The method according to claim 2, further comprising receiving, by the processor, the 3D point cloud data from the optical module as the subject is being scanned.

4. The method according to claim 3, further comprising using, by the processor, the 3D point cloud data and the radar data to create a map representing dimensions of the irregularly shaped object's body.

5. The method according to claim 1, wherein the at least one first visual characteristic comprises a color, a shape, or a size.

6. The method according to claim 1, wherein distance information is also superimposed on the 3D optical figure that specifies a distance from the handheld scanner system to the subject.

7. The method according to claim 1, further comprising causing, by the processor, at least one second visual characteristic of the first mark or a second mark of the marks to change to indicate a pointing direction of the handheld scanner system relative to the object being scanned.

8. The method according to claim 7, wherein the at least one second visual characteristic is different than the at least one first visual characteristic.

9. The method according to claim 7, further comprising causing, by the processor, the at least one second visual characteristic of the first or second mark to change to a previous setting when the pointing direction of the handheld scanner system changes.

10. The method according to claim 1, further comprising causing, by the processor, new marks to be additionally superimposed on top of the 3D optical figure when range data is successfully received during the scanning of the subject for a corresponding area of the object.

11. The method according to claim 1, wherein the irregularly shaped object is an individual and the at least one item is a garment being worn by the individual.

12. A system, comprising:
a processor;
a non-transitory computer-readable storage medium comprising programming instructions that are configured to cause the processor to implement a method for obtaining sizing of an irregularly shaped object using a handheld scanner system, wherein the programming instructions comprise instructions to:
display a 3D optical figure of a subject;
display a 2D grid superimposed over the 3D optical figure of the subject, the 2D grid comprising lines defining a plurality of 2D cells arranged in rows and columns;
provide a mark within each of the plurality of 2D cells, the marks being exclusive of data defining the 3D optical figure;
cause a radar module to generate range data specifying a sensed spacing between the radar module and at least a surface of a first portion of the irregularly shaped object which is covered by at least one item;
analyze the range data to identify at least one first mark of the marks provided in the plurality of 2D cells that corresponds to a location on the subject for which radar depth data was received;
cause the radar module to generate an optimized radar pattern based on variations of at least one first visual characteristic of the first mark.

13. The system according to claim 12, wherein the programming instructions further comprise instructions to cause an optical module to generate 3D point cloud data representing a surface of at least one item covering at least a first portion of the irregularly shaped object, and a surface of a second portion of the irregularly shaped object's surface which is exposed.

14. The system according to claim 13, wherein the programming instructions further comprise instructions to cause a processor to use the 3D point cloud data and the radar data to create a map representing dimensions of the irregularly shaped object's body.

15. The system according to claim 12, wherein the at least one first visual characteristic comprises a color, a shape, or a size.

16. The system according to claim 12, wherein distance information is also superimposed on the 3D optical figure that specifies a distance from the handheld scanner system to the subject.

17. The system according to claim 12, wherein the programming instructions further comprise instructions to cause at least one second visual characteristic of the first mark or a second mark of the marks to change to indicate a pointing direction of the handheld scanner system relative to the object being scanned.

18. The method according to claim 17, wherein the at least one second visual characteristic is different than the at least one first visual characteristic.

19. The system according to claim 17, wherein the programming instructions further comprise instructions to cause the at least one second visual characteristic of the first or second mark to change to a previous setting when the pointing direction of the handheld scanner system changes.

20. The system according to claim 12, wherein the programming instructions further comprise instructions to cause new marks to be additionally superimposed on top of the 3D optical figure when range data is successfully received during the scanning of the subject for a corresponding area of the object.

21. The system according to claim 12, wherein the irregularly shaped object is an individual and the at least one item is a garment being worn by the individual.

22. A handheld scanner system for obtaining sizing of an irregularly shaped object, the handheld scanner system comprising:
a housing;
an optical module including at least one 3D optical sensor configured to generate a 3D point cloud data representing (A) a surface of at least one item covering at least a first portion of the irregularly shaped object and (B) a surface of a second portion of the irregularly shaped object's surface which is exposed;
a radar module including at least one radar sensor configured to generate range data specifying a sensed spacing between the housing and at least a surface of the first portion of the irregularly shaped object which is covered by the at least one item;
a display configured to display a 2D grid superimposed over a 3D optical figure of the subject while the subject is being scanned using the optical module and the radar module, the 2D grid comprising a plurality of 2D cells arranged in rows and columns; and
a processor configured to
provide a mark within each of the plurality of 2D cells, the mark being exclusive of data defining the 3D optical figure;
receive the 3D point cloud data from the optical module and the range data from the radar module as the subject is being scanned,
analyze the range data to identify at least one first mark of the marks provided in the 2D cells that corresponds to a location on the irregularly shaped object for which radar depth data was received;
cause the radar module to generate an optimized radar pattern based on variations of at least one first visual characteristic of said at least one first mark; and
use the 3D point cloud data and the radar data to create a map representing dimensions of the irregularly shaped object's body.

23. The handheld scanner system according to claim 22, wherein the at least one first visual characteristic comprises a color, a shape, or a size.

24. The handheld scanner system according to claim 22, wherein distance information is also superimposed on the 3D optical figure that specifies a distance from the handheld scanner system to the subject.

25. The handheld scanner system according to claim 22, wherein the processor is further configured to cause at least one second visual characteristic of a mark of the marks to change to indicate a pointing direction of the handheld scanner system relative to the object being scanned.

26. The handheld scanner system according to claim 25, wherein the at least one second visual characteristic is different than the at least one first visual characteristic.

27. The handheld scanner system according to claim 25, wherein the processor is further configured to cause the at least one second visual characteristic of the mark to change to a previous setting when the pointing direction of the handheld scanner system changes.

28. The handheld scanner system according to claim 22, wherein the processor is further configured to cause new marks to be additionally superimposed on top of the 3D optical figure when range data is successfully received during the scanning of the subject for a corresponding area of the object.

29. The handheld scanner system according to claim 22, wherein the irregularly shaped object is an individual and the at least one item is a garment being worn by the individual.

30. The handheld scanner system according to claim 22, wherein the grid provides feedback to a user of the handheld scanner system about areas of the object that need to be scanned using the radar module.

\* \* \* \* \*